US012536522B2

(12) United States Patent
Rule et al.

(10) Patent No.: US 12,536,522 B2
(45) Date of Patent: Jan. 27, 2026

(54) SYSTEMS AND METHODS FOR TOUCH SCREEN INTERFACE INTERACTION USING A CARD OVERLAY

(71) Applicant: Capital One Services, LLC, McLean, VA (US)

(72) Inventors: Jeffrey Rule, McLean, VA (US); Kevin Osborn, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 137 days.

(21) Appl. No.: 17/830,642

(22) Filed: Jun. 2, 2022

(65) Prior Publication Data

US 2022/0292486 A1 Sep. 15, 2022

Related U.S. Application Data

(63) Continuation of application No. 16/245,658, filed on Jan. 11, 2019, now abandoned, and a continuation of
(Continued)

(51) Int. Cl.
*G06Q 20/32* (2012.01)
*G06F 3/044* (2006.01)
(Continued)

(52) U.S. Cl.
CPC ......... *G06Q 20/3227* (2013.01); *G06F 3/044* (2013.01); *G06F 3/04883* (2013.01);
(Continued)

(58) Field of Classification Search
None
See application file for complete search history.

(56) References Cited

U.S. PATENT DOCUMENTS 5,590,038 A 12/1996 Pitroda
5,666,415 A 9/1997 Kaufman
(Continued)

FOREIGN PATENT DOCUMENTS

CN 101192295 A 6/2008
GB 2516861 A 2/2015
(Continued)

OTHER PUBLICATIONS

Author Unknown, "EMV Integrated Circuit Card Specifications for Payments Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_ Security_and_Key_Management_20120607061923900.pdf, 174 pages.
(Continued)

*Primary Examiner* — Neha Patel
*Assistant Examiner* — Yin Y Choi
(74) *Attorney, Agent, or Firm* — KDW Firm PLLC

(57) ABSTRACT

Example embodiments of systems and methods for touch screen interface interaction using a card overlay are provided. In an embodiment, a body may include a first main side and a second main side opposite the first main side, wherein the body is positionable with respect to a touch screen interface. The transaction card may further inclue indicia on the body, the indicia identifying a plurality of apertures through the body, wherein a user input provided through the plurality of apertures actuates corresponding touch locations on the touch screen interface to authenticate a transaction.

20 Claims, 12 Drawing Sheets

Related U.S. Application Data application No. 16/245,796, filed on Jan. 11, 2019, now Pat. No. 11,361,302.

(51) Int. Cl.
| | |
|---|---|
| *G06F 3/04883* | (2022.01) |
| *G06Q 20/34* | (2012.01) |
| *G06Q 20/40* | (2012.01) |
| *H04W 12/63* | (2021.01) |

(52) U.S. Cl.
CPC ......... *G06Q 20/341* (2013.01); *G06Q 20/409* (2013.01); *H04W 12/63* (2021.01)

(56) References Cited

U.S. PATENT DOCUMENTS

| | | |
|---|---|---|
| 6,199,114 B1 | 3/2001 | White |
| 6,324,271 B1 | 11/2001 | Sawyer |
| 6,367,011 B1 | 4/2002 | Lee |
| 6,572,015 B1 | 6/2003 | Norton |
| 7,252,242 B2 | 8/2007 | Ho |
| 7,270,276 B2 | 9/2007 | Vayssiere |
| 7,287,692 B1 | 10/2007 | Patel |
| 7,374,099 B2 | 5/2008 | de Jong |
| 7,527,208 B2 | 5/2009 | Hammad |
| 7,568,631 B2 | 8/2009 | Gibbs |
| 7,584,153 B2 | 9/2009 | Brown |
| 7,628,322 B2 | 12/2009 | Holtmanns |
| 7,793,851 B2 | 9/2010 | Mullen |
| 7,801,799 B1 | 9/2010 | Brake, Jr. |
| 7,908,216 B1 | 3/2011 | Davis |
| 7,922,082 B2 | 4/2011 | Muscato |
| 8,010,405 B1 | 8/2011 | Bortolin |
| 8,074,877 B2 | 12/2011 | Mullen |
| 8,082,450 B2 | 12/2011 | Frey |
| 8,108,687 B2 | 1/2012 | Ellis |
| 8,186,602 B2 | 5/2012 | Itay |
| 8,196,131 B1 | 6/2012 | von Behren |
| 8,249,654 B1 | 8/2012 | Zhu |
| 8,276,814 B1 | 10/2012 | Davis |
| 8,332,272 B2 | 12/2012 | Fisher |
| 8,346,670 B2 | 1/2013 | Hasson |
| 8,511,547 B2 | 8/2013 | Rans |
| 8,519,822 B2 | 8/2013 | Riegebauer |
| 8,750,514 B2 | 6/2014 | Gallo |
| 8,870,081 B2 | 10/2014 | Olson |
| 9,038,893 B2 | 5/2015 | Kirkham |
| 9,052,753 B2 * | 6/2015 | Hong et al. |
| 9,129,199 B2 | 9/2015 | Spodak |
| 9,183,490 B2 | 11/2015 | Moreton |
| 9,275,325 B2 | 3/2016 | Newcombe |
| 9,286,606 B2 | 3/2016 | Diamond |
| 9,306,753 B1 | 4/2016 | Vandervort |
| 9,501,776 B2 | 11/2016 | Martin |
| 9,710,744 B2 | 7/2017 | Wurmfeld |
| 9,949,065 B1 | 4/2018 | Zarakas |
| 9,965,632 B1 | 5/2018 | Zarakas |
| 9,965,911 B2 | 5/2018 | Wishne |
| 9,977,890 B2 | 5/2018 | Alberti |
| 9,978,056 B2 | 5/2018 | Seo |
| 9,978,058 B2 | 5/2018 | Wurmfeld |
| 9,990,795 B2 | 6/2018 | Wurmfeld |
| 10,007,873 B2 | 6/2018 | Heo |
| 10,013,693 B2 | 7/2018 | Wyatt |
| 10,121,130 B2 | 11/2018 | Pinski |
| 10,210,505 B2 | 2/2019 | Zarakas |
| 10,242,368 B1 | 3/2019 | Poole |
| 10,296,910 B1 | 5/2019 | Templeton |
| 10,332,102 B2 | 6/2019 | Zarakas |
| 10,360,557 B2 | 7/2019 | Locke |
| 10,380,471 B2 | 8/2019 | Locke |
| 10,395,244 B1 | 8/2019 | Mossler |
| 10,453,054 B2 | 10/2019 | Zarakas |
| 10,474,941 B2 | 11/2019 | Wurmfeld |
| 10,475,027 B2 | 11/2019 | Guise |
| 10,482,453 B2 | 11/2019 | Zarakas |
| 10,482,457 B2 | 11/2019 | Poole |
| 10,489,774 B2 | 11/2019 | Zarakas |
| 10,489,781 B1 | 11/2019 | Osborn |
| 10,510,070 B2 | 12/2019 | Wurmfeld |
| 10,515,361 B2 | 12/2019 | Zarakas |
| 10,535,068 B2 | 1/2020 | Locke |
| 10,546,444 B2 | 1/2020 | Osborn |
| 10,581,611 B1 | 3/2020 | Osborn |
| 10,664,830 B1 | 5/2020 | Rule |
| 10,685,349 B2 | 6/2020 | Brickell |
| 10,797,882 B2 | 10/2020 | Rule |
| 10,880,741 B2 | 12/2020 | Zarakas |
| 10,909,525 B1 | 2/2021 | Dhodapkar |
| 10,970,691 B2 | 4/2021 | Koeppel |
| 10,984,416 B2 | 4/2021 | Ilincic |
| 11,037,136 B2 | 6/2021 | Rule |
| 11,062,098 B1 | 7/2021 | Bergeron |
| 11,120,453 B2 | 9/2021 | Rule |
| 11,138,593 B1 | 10/2021 | Ho |
| 11,138,605 B2 | 10/2021 | Aabye |
| 11,176,540 B2 | 11/2021 | Gupta |
| 11,188,908 B2 | 11/2021 | Locke |
| 11,216,806 B2 | 1/2022 | Mossler |
| 11,297,958 B2 | 4/2022 | Vukich |
| 11,334,872 B2 | 5/2022 | Phillips |
| 11,361,173 B2 | 6/2022 | Edwards |
| 11,392,933 B2 | 7/2022 | Mossler |
| 11,392,935 B2 | 7/2022 | Suresh |
| 11,416,844 B1 | 8/2022 | Osterkamp |
| 11,423,392 B1 | 8/2022 | Ho |
| 11,443,292 B2 | 9/2022 | Sherif |
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1 | 1/2023 | Cook |
| 11,556,918 B2 | 1/2023 | Mestre |
| 11,615,395 B2 | 3/2023 | McHugh |
| 11,777,933 B2 | 10/2023 | Moreton |
| 2002/0108039 A1 * | 8/2002 | Kubo et al. |
| 2003/0220876 A1 | 11/2003 | Burger |
| 2005/0156026 A1 | 7/2005 | Ghosh |
| 2005/0228997 A1 | 10/2005 | Bicker |
| 2005/0269402 A1 | 12/2005 | Spitzer |
| 2007/0276765 A1 | 11/2007 | Hazel |
| 2008/0052245 A1 * | 2/2008 | Love |
| 2008/0082452 A1 | 4/2008 | Wankmueller |
| 2008/0099552 A1 | 5/2008 | Grillion |
| 2009/0143104 A1 | 6/2009 | Loh |
| 2009/0200385 A1 * | 8/2009 | Hachey et al. |
| 2009/0235339 A1 | 9/2009 | Mennes |
| 2009/0282264 A1 | 11/2009 | Amiel |
| 2011/0108625 A1 * | 5/2011 | Lee |
| 2011/0113245 A1 | 5/2011 | Varadarajan |
| 2011/0155801 A1 | 6/2011 | Rowberry |
| 2012/0143703 A1 | 6/2012 | Wall |
| 2012/0290472 A1 * | 11/2012 | Mullen et al. |
| 2013/0030997 A1 | 1/2013 | Spodak |
| 2013/0146657 A1 | 6/2013 | Graef |
| 2013/0211937 A1 | 8/2013 | Elbirt |
| 2013/0311363 A1 | 11/2013 | Ramaci |
| 2014/0074637 A1 | 3/2014 | Hammad |
| 2014/0074655 A1 | 3/2014 | Lim |
| 2014/0081785 A1 | 3/2014 | Valadas Preto |
| 2014/0365377 A1 | 12/2014 | Salama |
| 2015/0006376 A1 * | 1/2015 | Nuthulapati et al. |
| 2015/0032635 A1 | 1/2015 | Guise |
| 2015/0073983 A1 | 3/2015 | Bartenstein |
| 2015/0113271 A1 | 4/2015 | Jooste |
| 2015/0134513 A1 | 5/2015 | Olson |
| 2015/0199673 A1 | 7/2015 | Savolainen |
| 2015/0199863 A1 | 7/2015 | Scoggins |
| 2015/0254637 A1 | 9/2015 | Yang |
| 2015/0317295 A1 | 11/2015 | Sherry |
| 2016/0078430 A1 | 3/2016 | Douglas |

(56) References Cited

U.S. PATENT DOCUMENTS

| | | | |
|---|---|---|---|
| 2016/0189143 | A1 | 6/2016 | Koeppel |
| 2016/0253651 | A1 | 9/2016 | Park |
| 2016/0277383 | A1 | 9/2016 | Guyomarc'h |
| 2016/0307189 | A1 | 10/2016 | Zarakas |
| 2016/0314472 | A1 | 10/2016 | Ashfield |
| 2016/0379217 | A1 | 12/2016 | Hammad |
| 2017/0017957 | A1 | 1/2017 | Radu |
| 2017/0039566 | A1 | 2/2017 | Schipperheijn |
| 2017/0068950 | A1 | 3/2017 | Kwon |
| 2017/0330173 | A1 | 11/2017 | Woo |
| 2018/0039987 | A1 | 2/2018 | Molino |
| 2018/0268132 | A1 | 9/2018 | Buer |
| 2018/0300716 | A1 | 10/2018 | Carlson |
| 2019/0050867 | A1 * | 2/2019 | Os et al. |
| 2019/0172055 | A1 | 6/2019 | Hale |
| 2019/0303945 | A1 | 10/2019 | Mitra |
| 2021/0004806 | A1 | 1/2021 | Noe |
| 2021/0272098 | A1 | 9/2021 | Delsuc |
| 2021/0304189 | A1 | 9/2021 | Gupta |
| 2021/0383360 | A1 | 12/2021 | Sinha |
| 2021/0406869 | A1 | 12/2021 | Pathrabe |
| 2022/0114581 | A1 | 4/2022 | Upadhye |
| 2022/0284416 | A1 | 9/2022 | Rule |
| 2022/0309509 | A1 | 9/2022 | Akgun |
| 2022/0335412 | A1 | 10/2022 | Rule |
| 2022/0366410 | A1 | 11/2022 | Rule |
| 2022/0398566 | A1 | 12/2022 | Rule |
| 2022/0414648 | A1 | 12/2022 | Rule |
| 2023/0054157 | A1 | 2/2023 | Mao |
| 2023/0065163 | A1 | 3/2023 | Vargas |
| 2023/0083785 | A1 | 3/2023 | Maiman |
| 2023/0169505 | A1 | 6/2023 | Rule |
| 2023/0354020 | A1 | 11/2023 | Rule |
| 2023/0359839 | A1 | 11/2023 | Lovgren |

FOREIGN PATENT DOCUMENTS

| | | | |
|---|---|---|---|
| GB | 2551907 | A | 1/2018 |
| KR | 20150140132 | A | 12/2015 |
| WO | 9910824 | A1 | 3/1999 |
| WO | 0049586 | A1 | 8/2000 |
| WO | 2013155562 | A1 | 10/2013 |
| WO | 2015183818 | A1 | 12/2015 |
| WO | WO2018048851 | A1 * | 9/2016 |
| WO | 2017047855 | A1 | 3/2017 |
| WO | 2019022585 | A1 | 1/2019 |
| WO | 2021051884 | A1 | 3/2021 |
| WO | 2021133492 | A1 | 7/2021 |
| WO | 2022108959 | A1 | 5/2022 |
| WO | 2022187350 | A1 | 9/2022 |
| WO | 2023017943 | A1 | 2/2023 |
| WO | 2023064063 | A1 | 4/2023 |

OTHER PUBLICATIONS

Author Unknown, "Global expansion of card tapping mobile OTP for security and convenience is imminent," Jun. 28, 2022, website: https://www.swidch.com/blogs/card-tapping-motp-blog.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author unknown, "EMV Card Personalization Specification", EMVCo., LLC., specification version 1.0, (2003) 81 pages.

Author Unknown, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, heeps://web.archive.org/, 75 pages.

Emvco: "EMV Card Personalisation Specification", Aug. 1, 2021, pp. 1-114, Retrieved from the Internet: URL: https://www.emvco.com/specifications/?post_id=12467.

Faraj, S.T., et al., "Investigation of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregrateMAC.pdf, 11 pages.

Pourghomi, P., et al., "A Proprosed NFC Payment Application," International Journal of Advanced Computer Science and Applications, 4(8):173-181 (2013).

Sauch: Getting information from an EMV chip card with Java, Sep. 8, 2006, WordPress, pp. 1-13.

Saxena, N., "Lecture 10: NMAC, HMAC and Number Theory", CS 6903 Modern Cryprography [online] 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008.

Ullmann et al., "On-Card" User Authentication for Contactless Smart Cards Based on Gesture Recognition, paper presentation LNI proceedings, (2012) 12 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

SYSTEMS AND METHODS FOR TOUCH SCREEN INTERFACE INTERACTION USING A CARD OVERLAY

CROSS-REFERENCE TO RELATED APPLICATIONS

This application is a Continuation of U.S. application Ser. No. 16/245,796, filed Jan. 11, 2019, which is a Continuation of U.S. application Ser. No. 16/245,658, filed on Jan. 11, 2019, the disclosure of which is incorporated herein by reference in its entirety.

FIELD OF THE INVENTION

The present disclosure relates to user and transaction card authentication, and more particularly, to user and transaction card authentication using a card overlay for touch screen interface interaction.

BACKGROUND

Data security and transaction integrity are of critical importance to businesses and consumers. This need continues to grow as electronic transactions constitute an increasingly large share of commercial activity.

Email may be used as a tool to verify transactions, but email is susceptible to attack and vulnerable to hacking or other unauthorized access. Short message service (SMS) messages may also be used, but that is subject to compromise as well. Moreover, even data encryption algorithms, such as triple data encryption standard (DES) algorithms, have similar vulnerabilities.

While the growing use of chip-based financial/transaction cards provides more secure features over previous technology (e.g., magnetic strip cards) for in-person purchases, account access still may rely on log-in credentials (e.g., username and password) to confirm a cardholder's identity. However, if the log-in credentials are compromised, or the user's transaction card is stolen, another person could have access to the user's account.

These and other deficiencies exist. Accordingly, there is a need to provide users with an appropriate solution that overcomes these deficiencies to provide data security, authentication, and verification for transaction cards. Further, there is a need for an improved method of card/user authentication for account access.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Embodiments of the present disclosure provide a transaction card including a body having a first main side and a second main side opposite the first main side, wherein the body is positionable with respect to a touch screen interface. The transaction card may further inclue indicia on the body, the indicia identifying one or more apertures through the body, wherein a user input provided through the one or more apertures actuates corresponding touch locations on the touch screen interface to authenticate a transaction.

Embodiments of the present disclosure provide a system including a system having a touch screen interface and a transaction card. The transaction card may include a body having a first main side and a second main side opposite the first main side, wherein the body is positionable with respect to a touch screen interface. The transaction card may further include indicia on the first main side of the body, the indicia identifying a plurality of apertures through the body, wherein a user input provided through one or more apertures of the plurality of apertures actuates corresponding touch locations on the touch screen interface to authenticate a transaction.

Embodiments of the present disclosure provide a method including providing a body of a transaction card, the body having a first main side and a second main side opposite the first main side, wherein the body is positionable with respect to a touch screen interface. The method may further include providing indicia on the first main side of the body, the indicia identifying one or more apertures through the body, wherein a user input provided through the one or more apertures actuates corresponding touch locations on the touch screen interface to authenticate a transaction.

BRIEF DESCRIPTION OF THE DRAWINGS

The accompanying drawings illustrate example approaches of the disclosure, including the practical application of the principles thereof, as follows.

Figure 1:
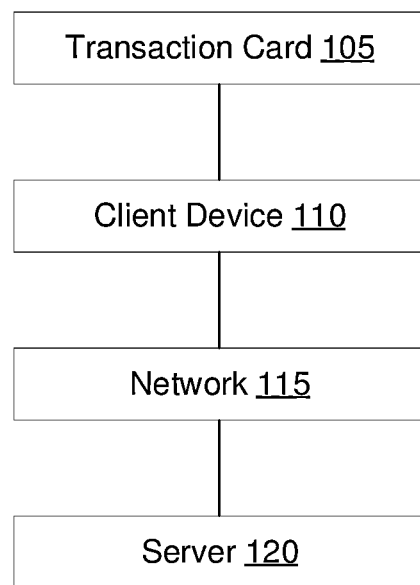
FIG. 1 is a diagram of a system according to an example embodiment.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, some reference numbers may be omitted in certain drawings.

DETAILED DESCRIPTION

The following detailed description provides non-limiting representative examples referencing numerals to particularly describe features and teachings of different aspects of the disclosure. The embodiments described should be recognized as capable of implementation separately, or in combination, with other embodiments from the detailed description. A person of ordinary skill in the art reviewing the detailed description should be able to learn and understand the different described aspects of the disclosure. The detailed description should facilitate understanding of the disclosure to such an extent that other implementations, not specifically covered but within the knowledge of a person of skill in the art having read the description of embodiments, would be understood to be consistent with an application of the disclosure.

An objective of some embodiments of the present disclosure is to verify/authenticate a transaction card and/or the customer in possession of the transaction card. In some embodiments, the transaction card includes indicia in unique or non-standard positions, wherein providing the authentication to a touch screen interface of a device requires pressing or otherwise actuating the positions on the transaction card. As such, the transaction card functions as a key to knowing where to press on the touch screen interface to authenticate the user and/or the transaction card. In some embodiments, the transaction card may include conductive pads on one or both sides of the card, wherein the conductive pads may be any component capable of recognizing and communicating a capacitive input from a user. During use, pressing the indicia on one side causes the conductive pads on the opposite side to impact the touch screen interface. Furthermore, in some embodiments, the transaction card may include one or more registration marks to allow the transaction card to be positioned with respect to one or more location indicators on the touch screen interface.

FIG. 1 illustrates a system 100 according to an example embodiment. As further discussed below, the system 100 may include a transaction card 105, a client device 110, a network 115, and a server 120. Although FIG. 1 illustrates single instances of the components, the system 100 may include any number of components.

The system 100 may include one or more transaction cards 105, which are further explained below with reference to FIGS. 4A-4C and FIGS. 7A-7C. In some embodiments, the transaction card 105 may be in wireless communication, utilizing NFC in an example, with the client device 110.

The system 100 may include the client device 110, which may be a network-enabled computer. As referred to herein, a network-enabled computer may include, but is not limited to, a computer device, or communications device including, e.g., a server, a network appliance, a personal computer, a workstation, a phone, a handheld PC, a personal digital assistant, a thin client, a fat client, an Internet browser, or other device. The client device 110 also may be a mobile device, for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device 110 can include a processor and a memory, and it is understood that the processing circuitry may contain additional components, including, memories, error and parity/CRC checkers, data encoders, anti-collision algorithms, controllers, command decoders, security primitives and tamper proofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, microphone, digital camera, video recorder or camcorder. These devices may be used to enter information and interact with the software and other devices described herein.

In some examples, the client device 110 of the system 100 may execute one or more applications, such as software applications, that enable, for example, network communications with one or more components of the system 100 and transmit and/or receive data. The client device 110 may be in communication with one or more servers 120 via one or more networks 115, and may operate as a respective front-end to back-end pair with the server 120. The client device 110 may transmit, for example, from a mobile device application executing on the client device 110, one or more requests to the server 120. The one or more requests may be associated with retrieving data from the server 120. The server 120 may receive the one or more requests from the client device 110. Based on the one or more requests from the client device 110, the server 120 may be configured to retrieve the requested data from one or more databases (not shown). Based on receipt of the requested data from the one or more databases, the server 120 may be configured to transmit the received data to the client device 110, the received data being responsive to one or more requests.

The system 100 may include one or more networks 115. In some examples, the network 115 may be one or more of a wireless network, a wired network or any combination of wireless network and wired network, and may be configured to connect client device 110 to server 120. For example, the network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 115 may include, without limitation, telephone lines, fiber optics, IEEE Ethernet 902.3, a wide area network, a wireless personal area network, a LAN, or a global network such as the Internet. In addition, the network 115 may support an Internet network, a wireless communication network, a cellular network, or the like, or any combination thereof. The network 115 may further include one network, or any number of the exemplary types of networks mentioned above, operating as a stand-alone network or in cooperation with each other. The network 115 may utilize one or more protocols of one or more network elements to which they are communicatively coupled. The network 115 may translate to or from other protocols to one or more protocols of network devices. Although the network 115 is depicted as a single network, it should be appreciated that according to one or more examples, the network 115 may comprise a plurality of interconnected networks, such as, for example, the Internet, a service provider's network, a cable television network, corporate networks, such as credit card association networks, and home networks.

The system 100 may include one or more servers 120. In some examples, the server 120 may include one or more processors, which are coupled to memory. The server 120 may be configured as a central system, server or platform to control and call various data at different times to execute a plurality of workflow actions. The server 120 may be configured to connect to the one or more databases. The server 120 may be connected to at least one client device 110.

Figure 2:
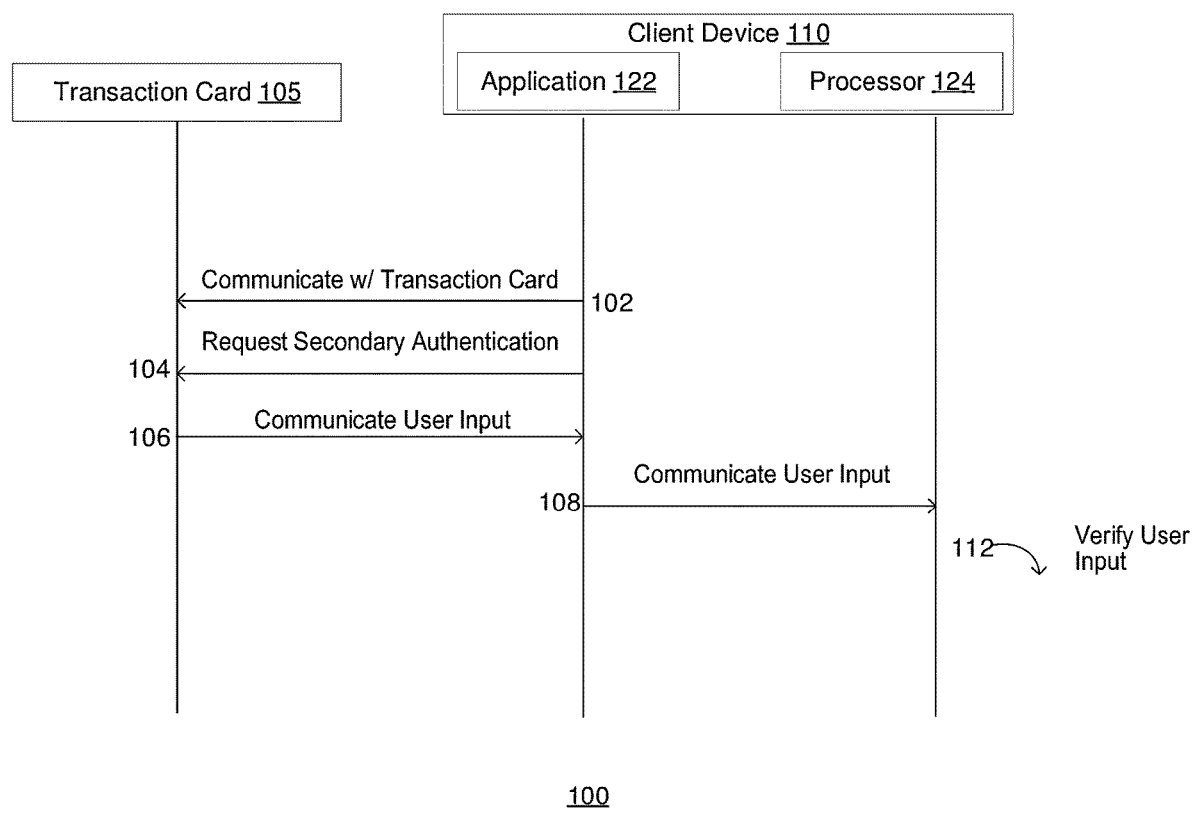
FIG. 2 is a diagram illustrating a sequence for providing authenticated access according to an example embodiment.

FIG. 2 is a timing diagram illustrating an example sequence for providing user/card authentication according to one or more embodiments of the present disclosure. The system 100 may comprise the transaction card 105 and the client device 110, which may include an application 122 and a processor 124. FIG. 2 may reference similar components as illustrated in FIG. 1.

At process 102, the application 122 communicates with the transaction card 105. Communication between the application 122 and the transaction card 105 may involve the transaction card 105 being sufficiently close to a card reader (not shown) of the client device 110 to enable NFC data transfer between the application 122 and the transaction card 105. In other embodiments, communication between the application 122 and the transaction card 105 may involve the transaction card 105 being used during a transaction recognized by the application 122. The application 122 may receive a primary authentication from an identification chip and/or magnetic stripe containing cardholder data in accordance with standard protocols.

At process 104, after communication has been established between the client device 110 and the transaction card 105, the application 122 may request secondary authentication for a transaction. At process 106, the transaction 105 may receive a user input, for example, to indicia along an exterior surface of the transaction card 105, and communicate the user input to the application 122. In some embodiments, the transaction card 105 is provided in direct physical contact with a touch screen interface of the client device 110.

At process 108, the application 122 communicates the user input to the processor 124. At process 112, the processor 124 may execute instructions to determine whether to authenticate the transaction based on a comparison between the user input and predetermined identification data. In some embodiments, the user input indicates at least one of: a position of each of the corresponding touch locations on the touch screen interface actuated by the user input, and/or an actuation sequence of the corresponding touch locations on the touch screen interface actuated by the user input.

In some examples, verifying the user input may be performed by a device other than the client device 110, such as the server 120 (e.g., as shown in FIG. 1) in data communication with the client device 110. For example, the processor 124 may output the position of each of the corresponding touch locations on the touch screen interface actuated by the user input and/or the actuation sequence of the corresponding touch locations on the touch screen interface as actuated by the user input, to the server 120. In some embodiments, the server 120 may verify the user input to the transaction card 105 by retrieving an expected input configuration associated with the transaction card, and comparing the position of each of the corresponding touch locations actuated by the user input to the expected input configuration. In other embodiments, the server 120 may verify the user input to the transaction card 105 by retrieving an account passcode associated with the transaction card, and comparing the actuation sequence of the corresponding touch locations actuated by the user input to the account passcode.

Figure 3:
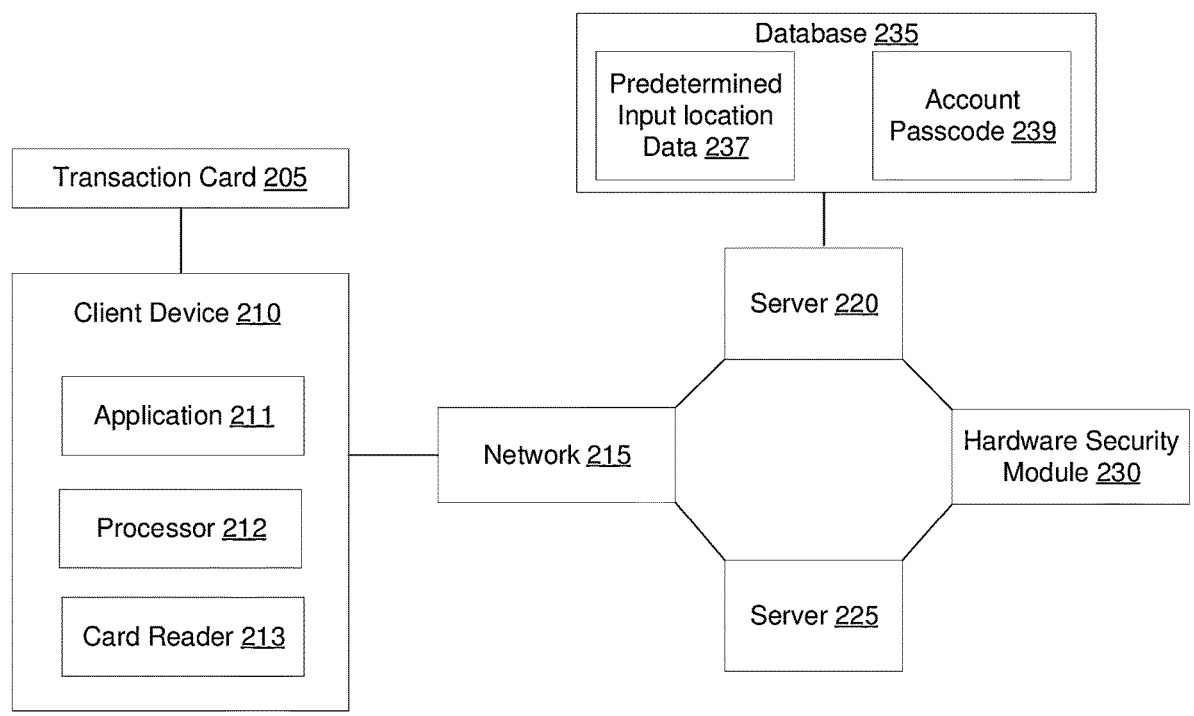
FIG. 3 is a diagram of a system using a transaction card according to an example embodiment.

FIG. 3 illustrates a system 200 using a transaction card 205, one or more client devices 210, a network 215, servers 220, 225, one or more hardware security modules 230, and a database 235. Although FIG. 3 illustrates single instances of the components, the system 200 may include any number of components.

The system 200 may include one or more transaction cards 205, which are further explained below with respect to FIGS. 4A-4C. In some examples, the transaction card 205 may be in wireless communication, for example NFC communication, with the client device 210. The transaction card 205 may comprise one or more chips, such as a radio frequency identification chip, configured to communication via NFC or other short-range protocols. In other embodiments, the transaction card 205 may communicate with the client device 210 through other means including, but not limited to, Bluetooth, satellite, Wi-Fi, wired communications, and/or any combination of wireless and wired connections. According to some embodiments, the transaction card 205 may be configured to communicate with the card reader 213 of the client device 210 through NFC when the transaction card 205 is within range of card reader 213. In other examples, communications with the transaction card 205 may be accomplished through a physical interface, e.g., a universal serial bus interface or a card swipe interface. As will be described in greater detail below, the transaction card 205 may communicate with the client device 210 using capacitive conductance when the transaction card 205 is placed atop/over an interface of the client device 210.

The system 200 may include the client device 210, which may be a network-enabled computer. As referred to herein, a network-enabled computer may include, but is not limited to: e.g., a computer device, or communications device including, e.g., a server, a network appliance, a personal computer, a workstation, a mobile device, a phone, a handheld PC, a personal digital assistant, a thin client, a fat client, an Internet browser, or other device. One or more client devices 210 also may be a mobile device. A mobile device may include an iPhone, iPod, iPad from Apple® or any other mobile device running Apple's iOS® operating system, any device running Microsoft's Windows® Mobile operating system, any device running Google's Android® operating system, and/or any other smartphone or like wearable mobile device. In some examples, the client device 210 may be the same as, or similar to, the client device 110 as described with reference to FIG. 1 and FIG. 2.

The client device 210 may be in communication with one or more servers 220 and 225 via one or more networks 215. The client device 210 may transmit, for example from an application 211 executing on the client device 210, one or more requests to one or more servers 220 and 225. The one or more requests may be associated with retrieving data from one or more servers 220 and 225. The servers 220 and 225 may receive the one or more requests from the client device 210. Based on the one or more requests from the client device 210, the one or more servers 220 and 225 may be configured to retrieve the requested data from one or more databases 235. Based on receipt of the requested data from the one or more databases 235, one or more servers 220 and 225 may be configured to transmit the received data to client device 210, the received data being responsive to one or more requests. For example, in some non-limiting embodiments, predetermined input location data 237 associated with the transaction card 205 and/or an account passcode 239 associated with the transaction card 205 may be retrieved from the one or more databases 235 in response to the requests from the servers 220 and 225.

In some embodiments, the system 200 may include one or more hardware security modules (HSM) 230. For example, one or more HSMs 230 may be configured to perform one or more cryptographic operations as disclosed herein. In some examples, one or more HSMs 230 may be configured as special purpose security devices that are configured to perform the one or more cryptographic operations. The HSMs 230 may be configured such that keys are never revealed outside the HSM 230, and instead are maintained within the HSM 230. For example, one or more HSMs 230 may be configured to perform at least one of key derivations, decryption, and MAC operations. The one or more HSMs 230 may be contained within, or may be in data communication with, the servers 220 and 225.

The system 200 may include one or more networks 215. In some examples, the network 215 may be one or more of a wireless network, a wired network or any combination of wireless network and wired network, and may be configured to connect the client device 210 to the servers 220, 225. For example, the network 215 may include one or more of a fiber optics network, a passive optical network, a cable network, a cellular network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, RFID, Wi-Fi, and/or any combination of networks thereof. As a non-limiting example, communications from the transaction card 205 and the client device 210 may comprise NFC communication, cellular network between the client device 210 and a carrier, and Internet between the carrier and a back-end.

In addition, the network 215 may include, without limitation, telephone lines, fiber optics, IEEE Ethernet 902.3, a wide area network, a wireless personal area network, a local area network, or a global network such as the Internet. In addition, the network 215 may support an Internet network, a wireless communication network, a cellular network, or the like, or any combination thereof. The network 215 may further include one network, or any number of the exemplary types of networks mentioned above, operating as a stand-alone network or in cooperation with each other. The network 215 may utilize one or more protocols of one or more network elements to which they are communicatively coupled. The network 215 may translate to or from other protocols to one or more protocols of network devices. Although the network 215 is depicted as a single network, it should be appreciated that according to one or more examples, the network 215 may comprise a plurality of interconnected networks, such as, for example, the Internet, a service provider's network, a cable television network, corporate networks, such as credit card association networks, and home networks.

In various examples according to the present disclosure, the client device 210 of the system 200 may execute one or more applications 211, and include one or more processors 212, and one or more card readers 213. For example, one or more applications 211, such as software applications, may be configured to enable, for example, network communications with one or more components of system 200 and transmit and/or receive data. It is understood that although only single instances of the components of client device 210 are illustrated in FIG. 3, any number of client devices 210 may be used. The card reader 213 may be configured to read from and/or communicate with the transaction card 205. In conjunction with the one or more applications 211, the card reader 213 may communicate with the transaction card 205.

The application 211 of any of the client devices 210 may communicate with the transaction card 205 using short-range wireless communication (e.g., NFC). The application 211 may be configured to interface with the card reader 213 of the client device 210, which is configured to communicate with the transaction card 205. As should be noted, those skilled in the art would understand that a distance of less than twenty centimeters is consistent with NFC range.

The server 220 may be a web server in communication with the database 235. The server 225 may include an account server. In some examples, the server 220 may be configured to validate one or more credentials from the transaction card 205 and/or client device 210 based on a comparison to one or more credentials in database 235. For example, the server 220 may compare the user input received at the client device 210 with predetermined identification data, such as an expected input configuration associated with indicia of the transaction card 205, and/or an account passcode associated with the transaction card 205. The server 225 may be configured to authorize one or more requests, such as a payment transaction, from the transaction card 205 and/or client device 210 based on this comparison.

Figure 4A:
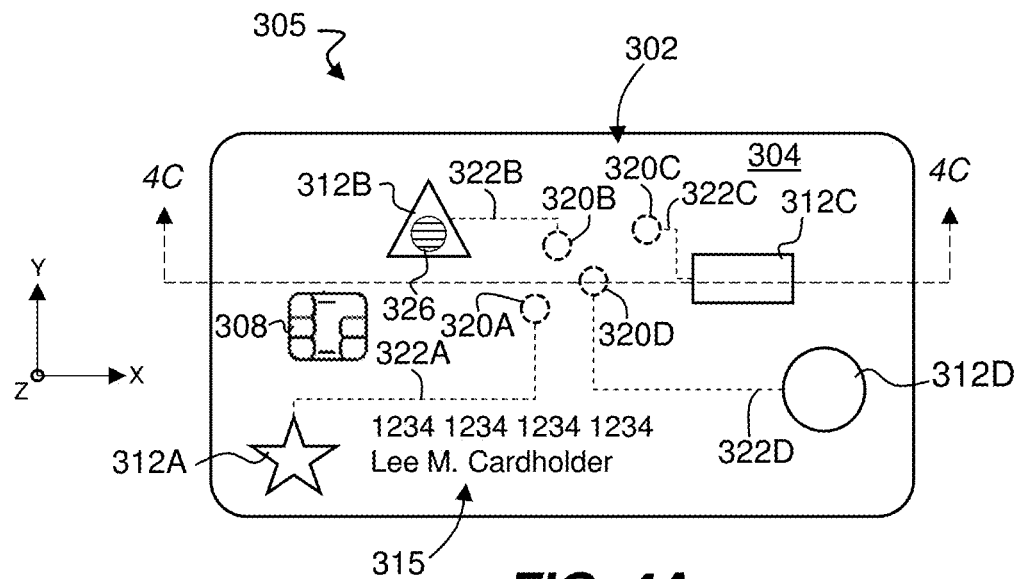
FIG. 4A is an illustration of a first side of a transaction card according to an example embodiment.
Figure 4B:
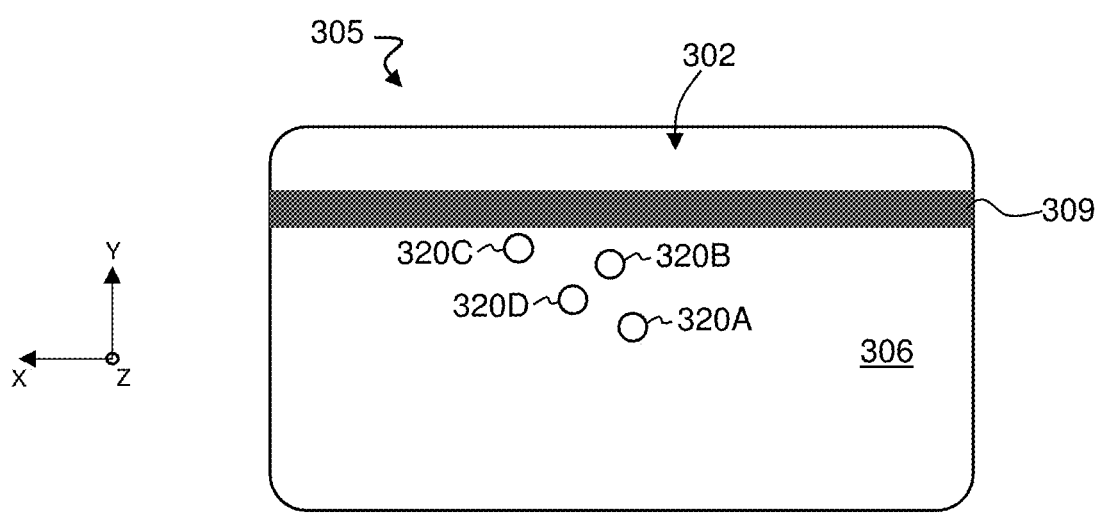
FIG. 4B is an illustration of a second side of the transaction card of FIG. 4A according to an example embodiment.
Figure 4C:
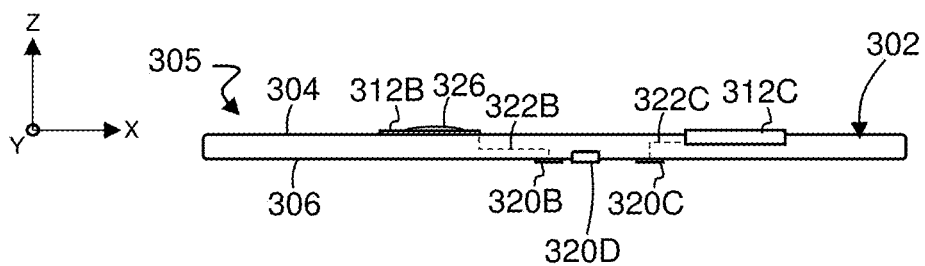
FIG. 4C is an illustration of a side cross-sectional view of the transaction card of FIG. 4A along cut-line 4C-4C according to an example embodiment.

FIGS. 4A-4C illustrate an example transaction card 305, which may be a payment card, such as a credit card, debit card, or gift card, issued by a service provider. In some examples, the transaction card 305 is not related to a payment card, and may comprise, without limitation, an identification card. In some examples, the transaction card 305 may be a dual interface contactless payment card. As shown, the transaction card 305 may include a body 302, which may be a substrate including a single layer or one or more laminated layers composed of plastics, metals, and other materials. In various embodiments, the body 302 may be made from any material(s) capable of conveying a capacitive user touch through the transaction card 305. The body 302 may be wholly or partially capacitively conductive, or the body 302 may include passive materials. As shown, the body 302 has a first main side 304 (i.e., top/front side) and a second main side 306 (i.e., bottom/back side).

Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the transaction card 305 may have physical characteristics compliant with the ID-1 format of the ISO/IEC 7810 standard, and the contactless card may otherwise be compliant with the ISO/IEC 14443 standard. However, it is understood that the transaction card 305 according to the present disclosure may have different characteristics, and the present disclosure is not limited to any particular card design.

In some embodiments, an identification chip 308 may be coupled (e.g., recessed or partially embedded) to the first main side 304 of the transaction card 305. As used herein, the identification chip 308 may be any microprocessor device configured to exchange data electromagnetically, such as a RFID chip. The RFID chip may include a radio frequency inductor, volatile or non-volatile memory storage, a microprocessor, circuitry logic, and/or an antenna. While in some embodiments electromagnetic data communications from the RFID chip will take place at radio frequencies, other embodiments may exchange electromagnetic data at different frequencies. The transaction card 305 may further include a magnetic stripe 309 on the second main side 306 of the body 302.

The transaction card 305 may also include identification information 315 displayed on the front and/or back of the card, and indicia 312A-312D on the first main side 304 of the body 302. As will be described in further detail below, the indicia 312A-312D identify touch locations on a touch screen interface for authenticating a transaction. The indicia 312A-312D are operable to communicate a user input to one or more capacitive sensing, or capacitively conductive, surfaces, such as conductive pads 320A-320D disposed along the second main side 306 of the body 302. In some embodiments, the indicia 312A-312D are each capacitive sensing conductive pads. In some embodiments, the indicia 312A-312D may be raised and/or colored features on the first main side 304 of the body 302. In other embodiments, the indicia 312A-312D may be printed markings, shapes, and/or numbers that are substantially planar with the first main side 304 of the body 302.

The conductive pads 320A-320D may be positioned directly beneath corresponding indicia 312A-312D on opposite sides of the body 302. Alternatively, as shown, the conductive pads 320A-320D may be separated from corresponding indicia 312A-312D (e.g., along the x-direction and/or the y-direction), and connected respectively by one or more conductive pathways 322A-322D. In non-limiting embodiments, the conductive pathways 322A-322D are embedded within the body 302 of the transaction card 305, between the first main side 304 and the second main side 306. The conductive pathways 322A-322D are operable to deliver a capacitive input (e.g., user touch) from the first main side 304 of the body 302 to the second main side 306 of the body 302. In alternative embodiments, the indicia 312A-312D and/or the transaction card 305 may be non-conductive. That is, a capacitive input from a user's finger may be sensed directly through the material of the card, e.g., without delivery through conductive pads, circuits, openings, etc.

In the embodiment shown, the conductive pads 320A-320D may deliver the capacitive input to establish contact with another communication device, such as a user device, smart phone, laptop, desktop, or tablet computer. For example, each of the conductive pads 320A-320D may be maintained in direct contact with a touch screen interface of the client device. When the user touches one or more of indicia 312A-312D, the capacitive input is delivered to the corresponding touch location(s) on the touch screen interface. Alternatively, the conductive pads 320A-320D may initially be separated from an outer surface of the touch screen interface when the transaction card 305 is positioned in place with the client device. As the user provides an input to one or more of the indicia 312A-312D, only the corresponding conductive pad(s) is individually depressed to make contact with the touch screen interface. In other embodiments, the first main side 304 and/or the second main side 306 may be mostly or entirely conductive. In other words, conductance is not limited only to the conductive pads 320A-320D. As a result, user inputs may be effective virtually anywhere on the transaction card 305. Although not shown, the transaction card 305 may also include processing circuitry, an antenna, and other components. These components may be located behind the conductive pads 320A-320D or elsewhere within the body 302 of the transaction card 305.

The transaction card 305 may function as an overlay for a computing device having a flat surface for data entry. The overlay includes the indicia 312A-312D visible on the first main side 304 of the body 302, and the corresponding conductive pads 320A-320D disposed along the second main side 306 of the body 302. The shape and placement of the indicia 312A-312D and/or the conductive pads 320A-320D may be variable and unique to each transaction card 305. Although non-limiting, the indicia 312A-312D may include raised features or buttons, such as a standard push-button switch, a contact-lens shape of a button, or other buttons to provide tactile feedback to a user. For example, indicium 312B may be positioned around a raised feature 326. The raised feature 326 may have the same or different shape as the indicium 312B.

In some embodiments, one or more of the indicia 312A-312D may be a button with an outer coating to protect an inner cavity. For example, a soft button cavity may be covered by a top surface coating, wherein the soft button cavity may be filled with air or liquid that is capable of detecting a change in the amount of pressure within the cavity. The cavity can be filled with a conductive material such that contact with the top surface causes the material inside the cavity to detect a contact, and to register selection of the soft button to provide appropriate feedback as a selection of the underlying soft button. The top surface of the button can be curved as a contact lens such that it pops up or down. The top surface can be a capacitive plastic in some embodiments for detecting touch.

In some embodiments, one or more of the indicia 312A-312D may be implemented as a standard push-button switch to provide feedback. The cavity may include a first lead and an opposing lead, which are not in contact with each other when the push-button is in its resting position. When a user depresses on the outermost surface of the button, the push-button switch is pushed downward so as to contact the leads. Once the push-button switch contacts the leads, the proper feedback is provided to the display as an input at the soft button underlying the overlay button surface.

As explained above, the transaction card 305 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that comprises a cryptographically secure OTP encoded as an NDEF text tag.

Figure 5A:
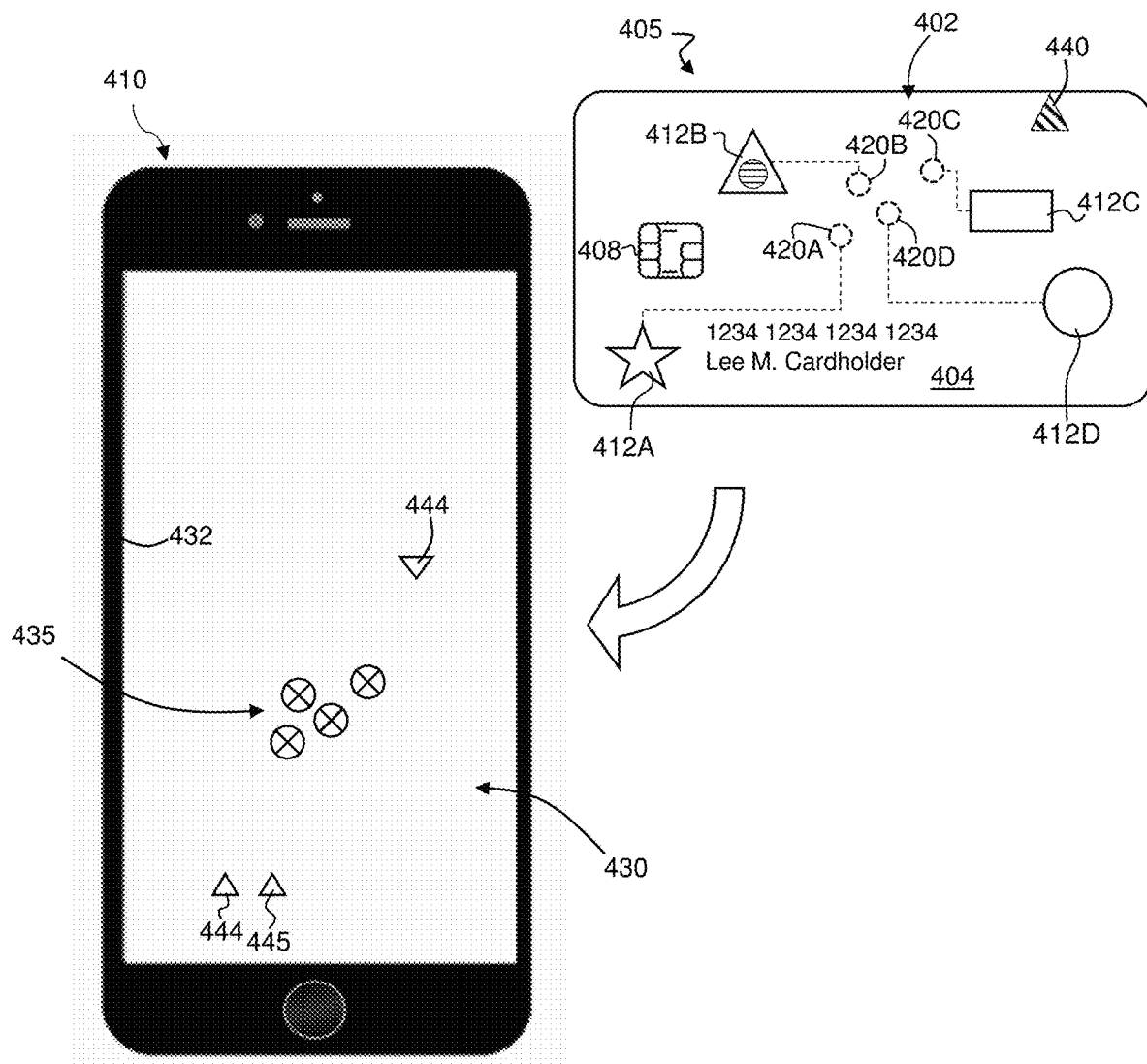
FIGS. 5A-5B are illustrations of a transaction card and client device according to an example embodiment.
Figure 5B:
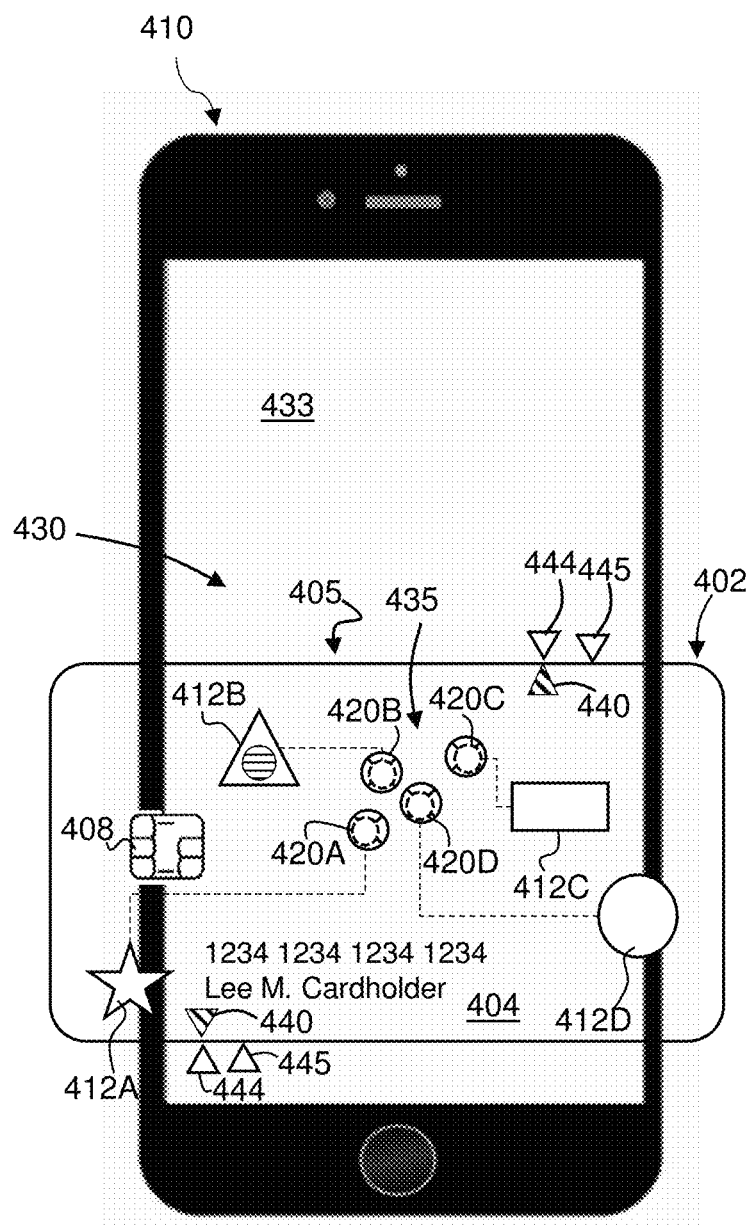

FIGS. 5A-5B illustrate an example transaction card 405 and client device 410. In the non-limiting embodiment shown, the client device 410 is a mobile device having a touch screen interface (hereinafter "interface") 430. The interface 430 may be a display capable of monitoring changes in electrical current. For example the interface 430 may be a capacitive touch screen having a layer of capacitive material to hold an electrical charge, wherein touching the screen changes the amount of charge at a specific point of contact. In other embodiments, the interface 430 may include a resistive screen, wherein pressure from a finger causes conductive and resistive layers of circuitry to touch each other, thus changing the circuits' resistance. Other interfaces may monitor changes in the reflection of waves, such as sound waves or beams of near-infrared light. In yet other embodiments, the interface 430 may use transducers to measure changes in vibration caused when an object, such as a finger or stylus, hits the screen's surface, or may use one or more cameras to monitor changes in light and shadow.

The body 402 of the transaction card 405 is positionable with respect to the interface 430 of the client device 410. As shown in FIG. 5B, the transaction card 405 may be placed atop the client device 410 such that the second main side of the body 402 is in direct physical contact with an outer surface 433 of the interface 430. The indicia 412A-412D on the first main side 404 of the transaction card 405 identify touch locations 435 of the interface 430 for authenticating a transaction, while the second main side of the body 402 is adapted to actuate the corresponding touch locations 435 when the transaction card 405 is placed over the interface 430 and the first main side 404 is actuated by a user. In non-limiting embodiments, the transaction card 405 may be transparent. As such, the indicia 412A-412D may be provided along the second main side of the body 402, or may be embedded within the body 402. Furthermore, although the touch locations 435 are visible in FIGS. 5A-5B for the sake of explanation, during use the touch locations 435 may not be displayed via the interface 430 with any indicia or visible markings. Instead, the touch locations 435 may remain visibly hidden for enhanced security.

The touch locations 435 may alternatively be displayed by the interface 430 and seen by the user through the transaction card 405, which may be at least partially transparent or translucent in this case. In this non-limiting example, the transaction card 405 may not necessarily include indicia 412A-412D, as the user may be guided by the touch locations 435 visible to him/her. In some embodiments, an identification chip 408 may be coupled (e.g., recessed or partially embedded) to the first main side 404 of the body 402 of the transaction card 405, and a magnetic stripe (not shown) may be provided on the second main side of the body 402 of the transaction card 405.

In some embodiments, the transaction card 405 includes one or more registration marks 440 to enable the transaction card 405 to be positioned with respect to one or more location indicators 444 on the interface 430. As shown, the registration marks 440 may be disposed along the first main side 404 of the body 402, and the location indicators 444 may be displayed to the user via the interface 430. To align the conductive pads 420A-420D with the touch locations 435, the user will align the registration marks 440 with the location indicators 444. In some embodiments, the location indicators 444 may be displayed in a first location on the interface 430 for a first transaction, and displayed in a second location on the interface 430 for a second transaction.

In some embodiments, the interface 430 may include a second set of location indicators 445 displayed to the user. For example, the location indicators 444 and the second set of location indicators 445 may be encoded, e.g., with different colors. During use, the user would know which color location indicator to use, thus adding another layer of user knowledge authentication on top of the user input communicated through the conductive pads 420A-420D. If the user aligns with transaction card with the incorrect location indicators, the transaction will fail. Furthermore, different messages may be communicated through the user input depending on which set of location indicators the user aligns the transaction card 405 with. For example, alignment with the location indicators 444, which are displayed in green, could result in a valid transaction, whereas alignment with the set of set of location indicators 445, which are displayed in yellow, could signal duress.

In some embodiments, the client device 410 may include, or operate with, one or more processors, similar to the processor 124 of FIG. 2 and the processor 212 of FIG. 3. The processor of the client device 410 may be configured to execute instructions to determine whether to authenticate a transaction based on a comparison between the user input, received at the indicia and delivered to the interface 430 via the conductive pads 420A-420D, and predetermined identification data. For example, the processor may be configured to receive the user input communicated through the conductive pads 420A-420D, and to determine a position of each of the corresponding touch locations 435 of the interface 430 actuated by the user input. The positions(s) may be an absolute position based on a distance from one or more boundaries 432 of the interface 430, or an absolute position determined according to a predefined coordinate or grid layout (not shown) of the interface 430. In other embodiments, the position(s) may be a relative position between one or more of the corresponding touch locations 435. In yet other embodiments, the position(s) may be a relative position between one or more of the corresponding touch locations and the location indicator 444. The processor may execute instructions to retrieve predetermined input location data, similar to the predetermined input location data 237 shown in FIG. 3, and to determine whether to authenticate the transaction based on a comparison between the detected position of each of the corresponding touch locations 435 on the touch screen interface 430 and the predetermined input location data. The processor may then generate an authentication result based on the comparison.

Alternatively, or additionally, the processor may be configured to receive an actuation sequence corresponding to the user input to the indicia 412A-412D. In some embodiments, the actuation sequence is a series or order of inputs provided to the indicia 412A-412D, for example, in response to a challenge question displayed via the interface 430 (e.g. touch the star, rectangle, and then the triangle). The actuation sequence may also be assigned or selected by the user, for example, when initially setting up his/her transaction card 405.

The processor is configured to then compare the detected actuation sequence to an account passcode, such as the account passcode 239 shown in FIG. 3, which is associated with the transaction card 405. The processor may then generate an authentication result based on the comparison.

Figure 6:
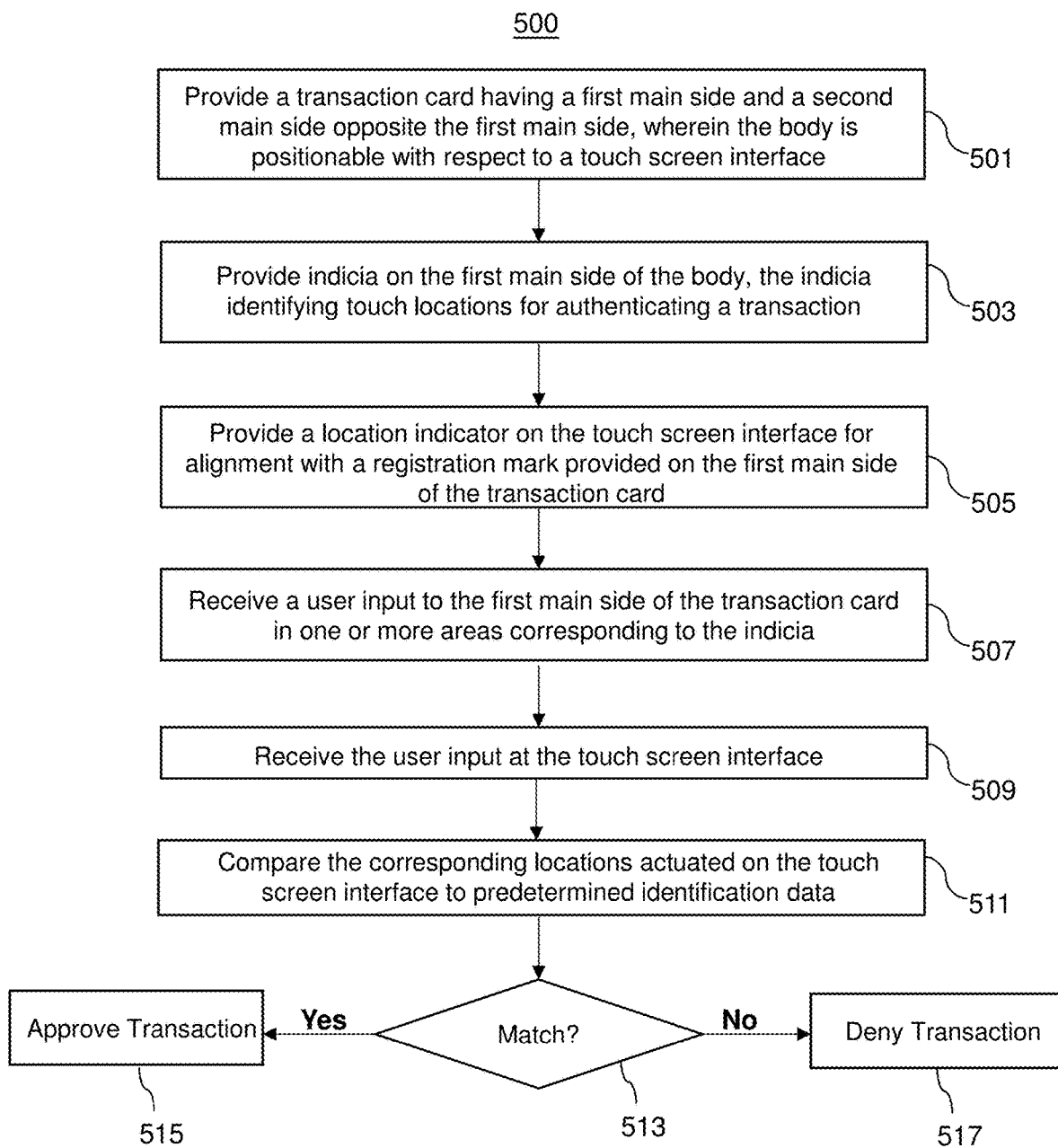
FIG. 6 is a flowchart illustrating a method for authenticating a transaction according to an example embodiment.

FIG. 6 is a flowchart illustrating a method 500 according to an example embodiment. As shown, at block 501, the method 500 may include providing a transaction card having a first main side and a second main side opposite the first main side, wherein the body is positionable with respect to a touch screen interface. In some embodiments, the touch screen interface is part of a client device, such as a mobile device. In some embodiments, the transaction card is provided in direct physical contact with the touch screen interface. In some embodiments, the body of the transaction card includes an identification chip and/or a magnetic stripe. In some embodiments, the touch screen interface is capable of recognizing a capacitive input.

At block 503, the method 500 may include providing indicia on the first main side of the body, the indicia identifying touch locations for authenticating a transaction. The second main side of the body may be adapted to actuate corresponding touch locations on the touch screen interface when the indicia on the first side of the body is actuated by a user. In some embodiments, the second main side of the body includes a capacitively conductive surface corresponding to the touch locations for authenticating the transaction. In some embodiments, at least one indicium of the indicia is positioned adjacent a raised feature on the main side of the body of the transaction card. In some embodiments, at least one indicium of the indicia is positioned adjacent a conductive pad on the first main side of the body of the transaction card. In some embodiments, a plurality of conductive pads may be provided on the second main side of the body, wherein the plurality of conductive pads is disposed adjacent one or more indicia and the first main side of the transaction card.

At block 505, the method 500 may include providing a location indicator on the touch screen interface. The location indicator may be used for alignment with a registration mark provided on the first main side of the transaction card. In the case the transaction card is transparent, the registration mark may be provided on the second main side of the body, or embedded within the body. In some embodiments, the location indicator is randomly generated in a new location for each transaction. Accordingly, the corresponding touch locations on the touch screen interface for authenticating the transaction may be adjusted based on the newly established position of the location indicator.

At block 507, the method 500 may include receiving a user input to the first main side of the transaction card in one or more areas corresponding to the indicia. In some embodiments, the indicia include any number of sensor types for capacitive sensing, including, but not limited to, sensors to detect and measure proximity, position and displacement, force, humidity, fluid level, and acceleration. In some embodiments, the indicia include one or more mechanical buttons capable of recognizing and communicating a user input.

At block 509, the method 500 may include receiving the user input at the touch screen interface. In some embodiments, the user input actuates corresponding touch locations on the touch screen interface when the indicia on the first main side are actuated by the user.

At block 511, the method 500 may include comparing the corresponding touch locations actuated on the touch screen interface to predetermined identification data. In some embodiments, the positions of the corresponding touch locations actuated by the user input are compared to an expected input configuration. In some embodiments, the detected sequence of the corresponding touch locations actuated by the user input is compared to an account passcode associated with the user and the transaction card. If the comparison results in a match at block 513, then the transaction is authenticated at block 515. If the comparison is not satisfied, then the transaction is denied at block 517.

Figure 7A:
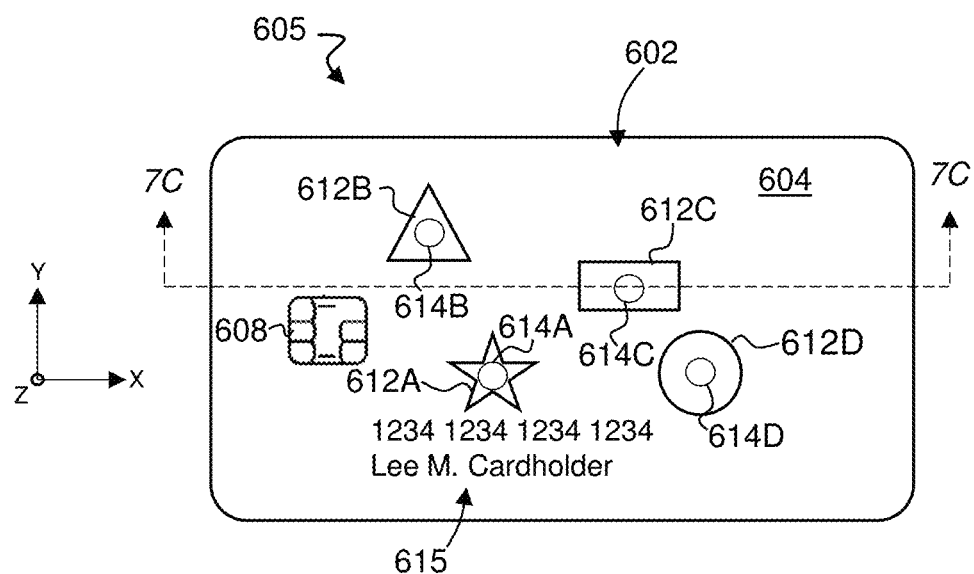
FIG. 7A is an illustration of a first side of a transaction card according to an example embodiment.
Figure 7B:
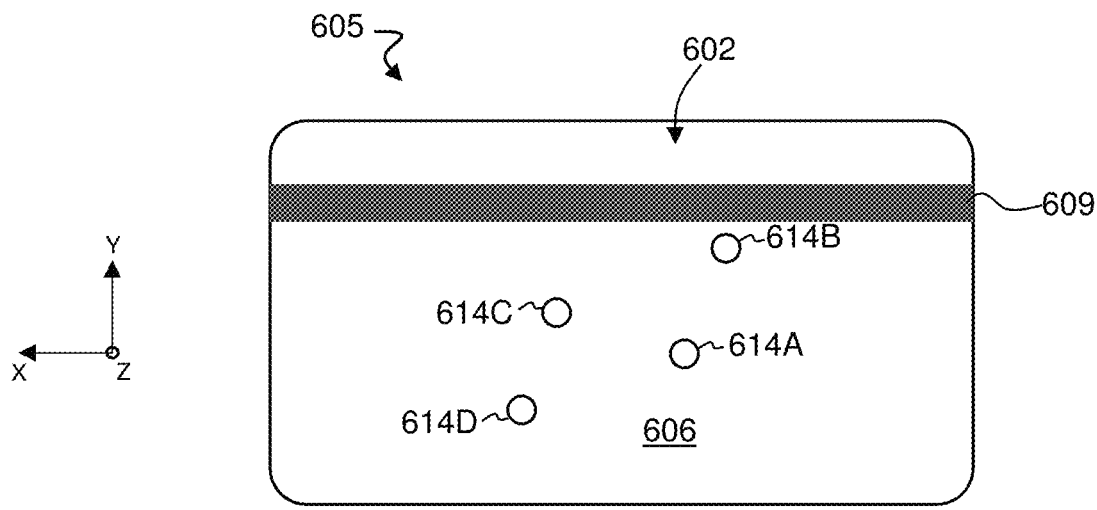
FIG. 7B is an illustration of a second side of the transaction card of FIG. 7A according to an example embodiment.
Figure 7C:
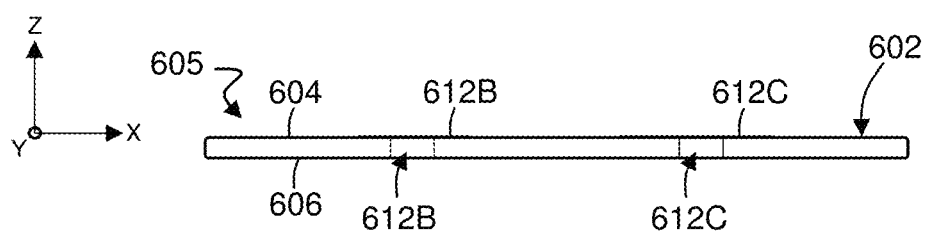
FIG. 7C is an illustration of a side cross-sectional view of the transaction card of FIG. 7A along cut-line 7C-7C according to an example embodiment.

FIGS. 7A-7C illustrate an example transaction card 605, which may be a payment card, such as a credit card, debit card, or gift card, issued by a service provider. In some examples, the transaction card 605 is not related to a payment card, and may comprise, without limitation, an identification card. In some examples, the transaction card may be a dual interface contactless payment card. The transaction card 605 may function as an overlay for a computing device having a flat surface for data entry. The overlay includes indicia 612A-612D visible on a first main side 604 of a body 602, wherein the shape and placement of the indicia 612A-612D may be variable/unique to each transaction card 605.

As shown, the transaction card 605 includes the body 602, which may be a substrate including a single layer or one or more laminated layers composed of plastics, metals, and other materials. The body 602 has a first main side 604 (i.e., top/front side) and a second main side 606 (i.e., bottom/back side). In some embodiments, an identification chip 608 may be coupled (e.g., recessed or partially embedded) to the first main side 604 of the transaction card 605. The transaction card 605 may further include a magnetic stripe 609 on the second main side 606 of the body 602.

The transaction card 605 may also include identification information 615 displayed on the front and/or back of the card, and indicia 612A-612D on the first main side 604 of the body 602. As will be described in further detail below, the indicia 612A-612D identify touch locations on a user interface for authenticating a transaction. In some embodiments, each of the indicia 612A-612D may visually and/or tactilely identify one or more corresponding apertures 614A-614D formed through the transaction card 605, wherein a user input through the apertures 614A-614D may actuate corresponding touch location on the touch screen interface. In the non-limiting embodiment shown, the indicia 612A-612D are disposed around the apertures 614A-614D, respectfully. In other embodiments, the indicia 612A-612D may be disposed merely adjacent (e.g., offset in either the x-direction or the y-direction) to the apertures 614A-614D. The indicia 612A-612D may be printed markings, shapes, and/or numbers that are substantially planar with the first main side 604 of the body 602. In other embodiments, the indicia 612A-612D may be raised above a surface of the first main side 604 of the body 602.

Although the apertures 614A-614D are shown as circular cut-out openings, one or more of apertures 614A-614D can also be square-shaped, rectangular shaped, oval shaped, or virtually any other shape. The shape and placement of the apertures 614A-614D is variable depending upon the particular computing device onto which the overlay is overlaid, as well as the particular application executing on the computing device. In some embodiments, one or more of apertures 614A-614D may have a depressed edge or a raised edge that provides sensory feedback to the user.

In some embodiments, the apertures 614A-614D may deliver the capacitive input to establish contact with another communication device, such as a user device, smart phone, laptop, desktop, or tablet computer. For example, the transaction card 605 may be in direct contact with a touch screen interface of the client device. When the user touches the one or more apertures 614A-614D, the capacitive input from the user's finger is delivered to the corresponding touch location(s) on the touch screen interface. In other embodiments, the one or more of apertures 614A-614D may be covered along the second main side 606 of the body 602 by a conductive pad. The capacitive input from the user may be delivered through the opening to the conductive pad, and then to the touch screen interface.

Figure 8A:
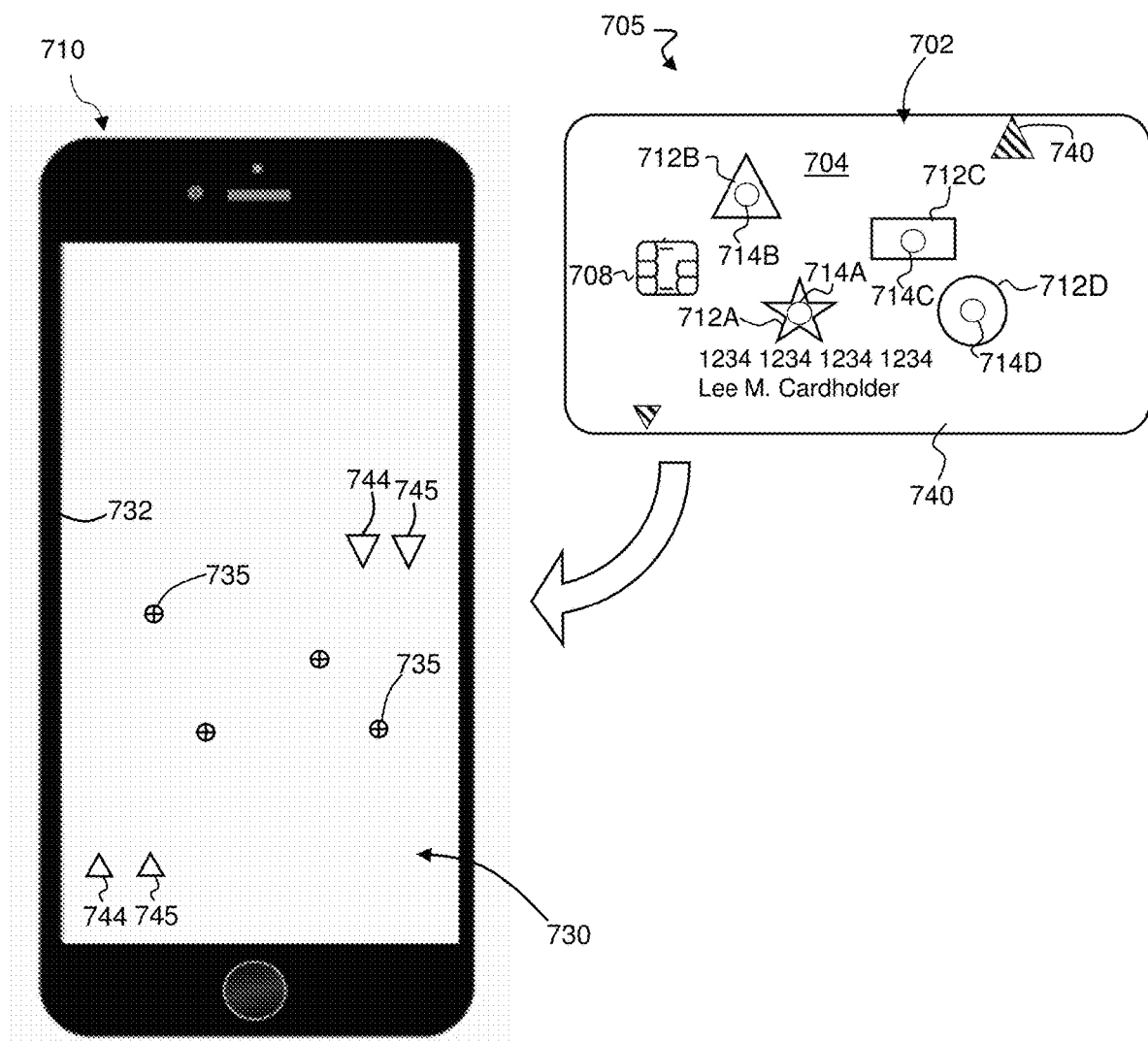
FIGS. 8A-8B are illustrations of a transaction card and client device according to an example embodiment.
Figure 8B:
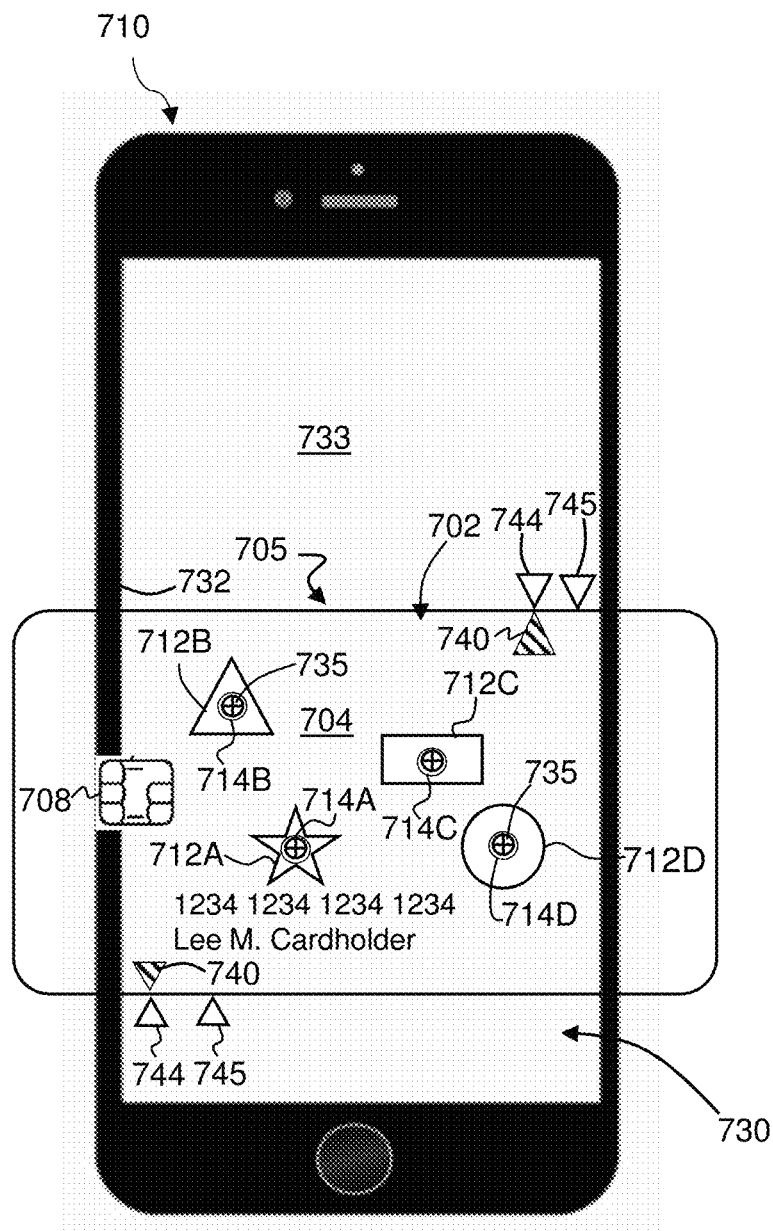

FIGS. 8A-8B illustrate an example transaction card 705 and client device 710. In the non-limiting embodiment shown, the client device 710 is a mobile device having a touch screen interface (hereinafter "interface") 730. The interface 730 may be a display capable of monitoring changes in electrical current. For example the interface 730 may be a capacitive touch screen having a layer of capacitive material to hold an electrical charge, wherein touching the screen changes the amount of charge at a specific point of contact. In other embodiments, the interface 730 may include a resistive screen, wherein pressure from a finger causes conductive and resistive layers of circuitry to touch each other, thus changing the circuits' resistance. Others interfaces may monitor changes in the reflection of waves, such as sound waves or beams of near-infrared light. In yet other embodiments, the interface 430 may use transducers to measure changes in vibration caused when an object, such as a finger or stylus, hits the screen's surface, or may use one or more cameras to monitor changes in light and shadow.

The body 702 of the transaction card 705 is positionable with respect to the interface 730 of the client device 710. As shown in FIG. 8B, the transaction card 705 may be placed atop the client device 710 such that the second main side of the body 702 is in direct physical contact with an outer surface 733 of the interface 730. In some embodiments, an identification chip 708 may be coupled (e.g., recessed or partially embedded) to the first main side 704 of the body 702 of the transaction card 705, and a magnetic stripe (not shown) may be provided on the second main side of the body 702 of the transaction card 705.

The indicia 712A-712D identify a plurailty of openings 714A-714D formed through the body. During use, a user input provided through the plurality of apertures 714A-714D actuates corresponding touch locations 735 on interface 730 to authenticate a transaction. In non-limiting embodiments, the transaction card 705 may be transparent. As such, the indicia 712A-712D may be provided along the first main side 704 of the body 702, the second main side of the body 702, or embedded within the body 702. Furthermore, although the touch locations are visible in FIGS. 8A-8B for the sake of explanation, during use the touch locations 735 may not be displayed via the interface 730, e.g., using graphically generated indicia or visible markings. Instead, the touch locations 735 may remain visibly hidden for enhanced security.

The touch locations 735 may alternatively be displayed by the interface 730 and seen by the user through the transaction card 705, which may be at least partially transparent or translucent. In this non-limiting example, the transaction card 705 may not necessarily include indicia 712A-712D.

In some embodiments, the transaction card 705 includes one or more registration marks 740 to enable the transaction card 705 to be positioned with respect to one or more location indicators 744 on the interface 730. As shown, the registration marks 740 may be disposed along the first main side 704 of the body 702, and the location indicators 744 may be displayed to the user via the interface 730. To align the plurality of apertures 714A-714D with the touch locations 735, the user may align the registration marks 740 with the location indicators 744. In some embodiments, the location indicators 744 may be displayed in a first location on the interface 730 for a first transaction, and displayed in a second location on the interface 730 for a second transaction. Furthermore, in some embodiments, the interface 730 may include a second set of location indicators 745 displayed to the user. For example, the location indicators 744 and the second set of location indicators 745 may be encoded, e.g., with different colors. During use, the user would know which color location indicator to use, thus adding another layer of user knowledge authentication on top of the user input communicated through the plurality of apertures 714A-714D.

In some embodiments, the client device 710 may include, or operate with, one or more processors, similar to the processor 124 of FIG. 2 and the processor 212 of FIG. 3. The processor of the client device 710 may be configured to execute instructions to determine whether to authenticate a transaction based on a comparison between predetermined identification data stored within memory, such as the database 235 of FIG. 3, and the user input, which is received at the indicia 712A-712D and delivered to the interface 730 via the plurality of apertures 714A-714D. For example, the processor may be configured to receive the capacitive user input transmitted through the plurality of apertures 714A-714D, and to determine a position of each of the corresponding touch locations 735 of the interface 730 actuated by the user input. The positions(s) may be an absolute position based on a distance from one or more boundaries 732 of the interface 730, or an absolute position determined according to a predefined coordinate or grid layout (not shown) of the interface 730. In other embodiments, the position(s) may be a relative position between one or more of the corresponding touch locations 735. In yet other embodiments, the position(s) may be a relative position between one or more of the corresponding touch locations and the location indicator 744. The processor may execute instructions to retrieve predetermined input location data, similar to the predetermined input location data 237 shown in FIG. 3, and to determine whether to authenticate the transaction based on a comparison between the detected position of each of the corresponding touch locations 735 on the touch screen interface 730 and the predetermined input location data. The processor may then generate an authentication result based on the comparison.

Alternatively, or additionally, the processor may be configured to receive an actuation sequence corresponding to the user input to the plurality of apertures 714A-714D. In some embodiments, the actuation sequence is a series or order of inputs provided to the touch locations 735 via the plurality of apertures 714A-714D, for example, in response to a challenge question displayed via the interface 730 (e.g. touch the star, rectangle, and then the triangle). The actuation sequence may also be assigned or selected by the user, for example, when initially setting up his/her transaction card 705.

The processor is configured to then compare the detected actuation sequence to an account passcode, such as the account passcode 239 shown in FIG. 3, which is associated with the transaction card 705. The account passcode may be an expected actuation sequence to the touch locations 735. The processor may then generate an authentication result based on the comparison.

Figure 9:
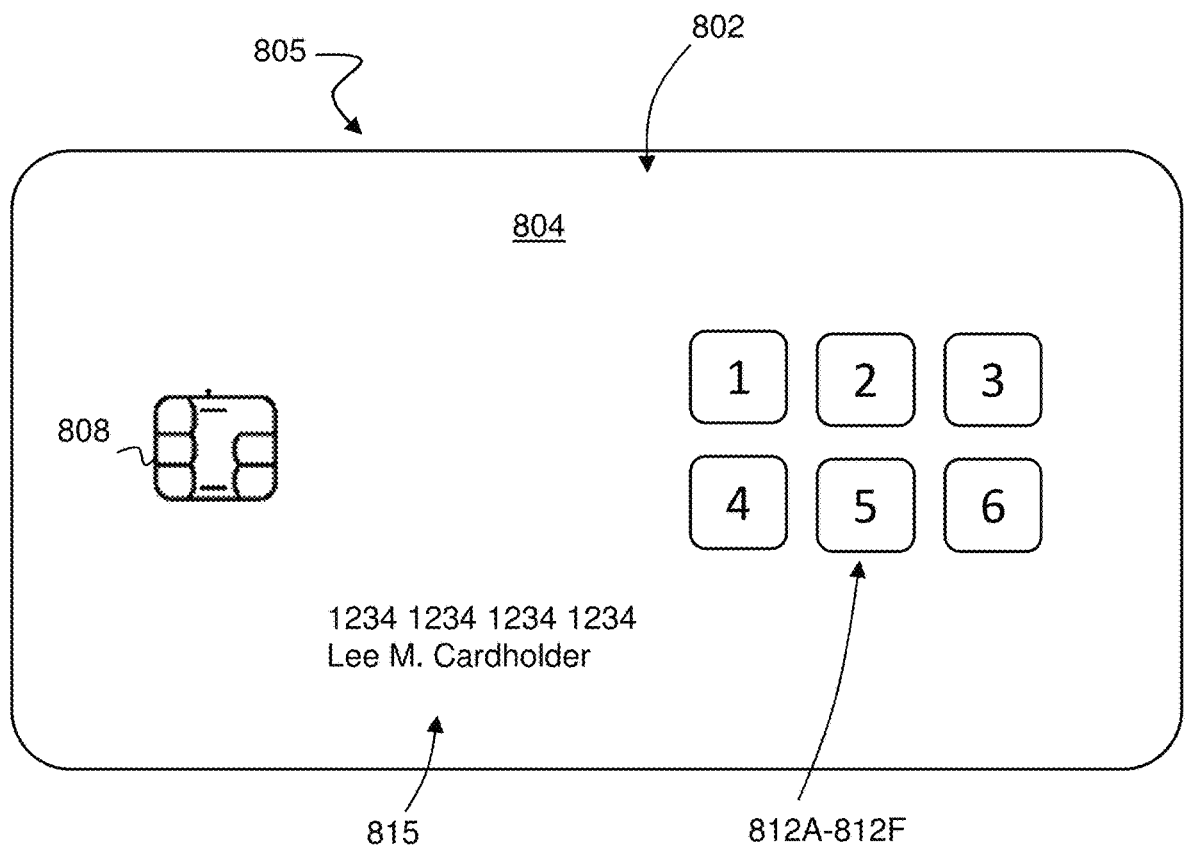
FIG. 9 is an illustration of a transaction card according to an example embodiment.
Figure 10:
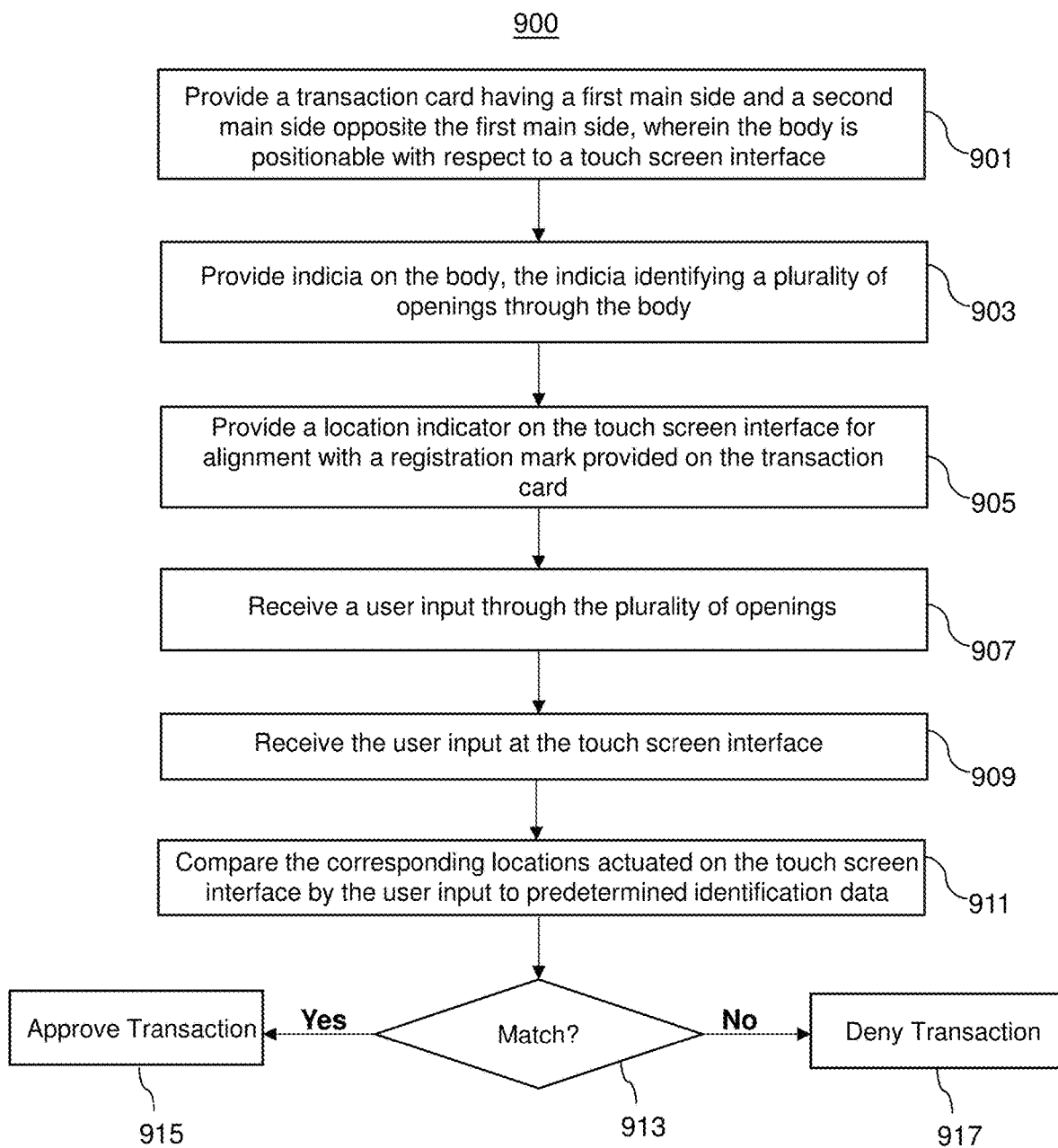
FIG. 10 is a flowchart illustrating a method for authenticating a transaction according to an example embodiment.

FIG. 9 illustrates another example transaction card 805, which may be a payment card, such as a credit card, debit card, or gift card, issued by a service provider. As shown, the transaction card 805 may include a body 802, which may be a substrate including a single layer or one or more laminated layers composed of plastics, metals, and other materials. The body 802 has a first main side 804 (i.e., top/front side) and a second main side opposite the first main side 804.

In some embodiments, an identification chip 808 may be coupled (e.g., recessed or partially embedded) to the first main side 804 of the transaction card 805. As used herein, the identification chip 808 may be any microprocessor device configured to exchange data electromagnetically, such as a RFID chip. The transaction card 805 may further include a magnetic stripe (not shown) on the second main side of the body 802.

The transaction card 805 may also include identification information 815 displayed on the front and/or back of the card, and indicia 812A-812F on the first main side 804 of the body 802. As will be described in further detail below, the indicia 812A-812F correspond to touch locations on a touch screen interface for authenticating a transaction. The indicia 812A-812F are operable to communicate a user input to one or more conductive surfaces, such as conductive pads disposed along the second main side of the body 802. In some embodiments, the indicia 812A-812F are each conductive pads provided as a set of numbers, such as the keypad shown. In alternative embodiments, the indicia 812A-812F and the transaction card 805 are non-conductive. A capacitive input from a user's finger may be sensed directly through the material of the card, e.g., without delivery through circuits, openings, etc.

As described above, the transaction card 805 may function as an overlay for a computing device having a flat surface for data entry. A processor of the computing device may be configured to receive an actuation sequence via the indicia 812A-812F. In some embodiments, the actuation sequence is a series or order of inputs, such as a numerical passcode, provided to the indicia 812A-812F. The processor is configured to then compare the detected actuation sequence to an account passcode, such as the account passcode 239 shown in FIG. 3, which is associated with the transaction card 805. The processor may then generate an authentication result based on the comparison.

FIG. 9 is a flowchart illustrating a method 900 according to an example embodiment. As shown, at block 901, the method 900 may include providing a body of a transaction card, the body having a first main side and a second main side opposite the first main side, wherein the body is positionable with respect to a touch screen interface. In some embodiments, the touch screen interface is part of a client device, such as a mobile device. In some embodiments, the transaction card is provided in direct physical contact with the touch screen interface. In some embodiments, the body of the transaction card includes an identification chip and/or a magnetic stripe. In some embodiments, the touch screen interface is capable of recognizing a capacitive input.

At block 903, the method 900 may include providing indicia on the body of the transaction card, wherein the indicia identify a plurality of apertures through the body, and wherein a user input provided through the plurality of apertures actuates corresponding touch locations on the touch screen interface to authenticate a transaction. In some embodiments, the indicia may be provided on the first main side of the body. In some embodiments, the indicia may be provided along the second main side of the body or embedded within the body.

At block 905, the method 900 may include providing one or more location indicators on the touch screen interface. The location indicators may be used for alignment with one or more registration marks provided on the first main side of the transaction card. In the case the transaction card is transparent, the registration mark may be provided on the second main side of the body or may be embedded within the body. In some embodiments, the location indicator(s) is randomly generated in a new location for each transaction. Accordingly, the corresponding touch locations on the touch screen interface for authenticating the transaction may be adjusted based on the newly established position of the location indicator.

At block 907, after the transaction card has been positioned atop/over the touch screen interface of the client device, the method 900 may include receiving a user input through the plurality of apertures. In some embodiments, the user input is a capacitive input provided by the finger of a user.

At block 909, the method 900 may include receiving the user input at the touch screen interface. In some embodiments, the user input actuates corresponding touch locations on the touch screen interface when the plurality of apertures is actuated by the user.

At block 911, the method 900 may include comparing the corresponding touch locations actuated on the touch screen interface to predetermined identification data. In some embodiments, the positions of the corresponding touch locations actuated by the user input are compared to an expected input configuration. In some embodiments, the detected sequence of the corresponding touch locations actuated by the user input is compared to an account passcode associated with the user and the transaction card. If the comparison results in a match at block 913, then the transaction is authenticated at block 915. If the comparison is not satisfied, then the transaction is denied at block 917.

Example embodiments of systems and methods described herein may be configured to provide security factor authentication. The security factor authentication may comprise a plurality of processes. As part of the security factor authentication, a first process may comprise logging in and validating a user via one or more applications executing on a device. As a second process, the user may, responsive to successful login and validation of the first process via the one or more applications, engage in one or more behaviors associated with one or more contactless cards. In effect, the security factor authentication may include both securely proving identity of the user and engaging in one or more types of behaviors, including, but not limited to, an input to indicia on an exterior surface of a transaction card operable with the device, as described herein.

In some examples, the transaction card described herein may be overlaid on a device, such as one or more computer kiosks or terminals, to verify identity so as to receive a transactional item responsive to a purchase, such as a coffee. By using the transaction card as an overlay, a secure method of proving identity may be established. Securely proving the identity, for example, to obtain a reward, coupon, offer, or the like or receipt of a benefit is established in a manner that is different than merely scanning a bar card. For example, an encrypted transaction may occur between the transaction card and the device, which may be configured to process one or more physical user inputs to the surface of the transaction card in one or more areas corresponding to the indicia. As explained above, the one or more applications may be configured to validate identity of the user and then cause the user to act or respond to it, for example, via one or more input gestures. In some examples, data such as bonus points, loyalty points, reward points, healthcare information, etc., may be written back to the transaction card.

In some examples, the transaction card may be an overlay for a mobile device. As explained above, identity of the user may be verified by the one or more applications which would then grant the user a desired benefit based on verification of the identity.

In some examples, the transaction card may be activated by overlaying the transaction card on a device, such as a mobile device. For example, the transaction card may communicate with an application of the device via a card reader of the device through NFC communication, as well as through the transaction card operating as an overlay. The communication, in which the user input to the indicia of the card proximate the card reader of the device may allow the application of the device to read data associated with the transaction card and activate the card. In some examples, the activation may authorize the card to be used to perform other functions, e.g., purchases, access account or restricted information, or other functions. In some examples, the user input may activate or launch the application of the device and then initiate one or more actions or communications with one or more servers to activate the transaction card. Subsequent to installation, a user input to the transaction card may activate or launch the application, and then initiate, for example, via the application or other back-end communication, activation of the transaction card. After activation, the transaction card may be used in various activities, including, without limitation, commercial transactions.

In some embodiments, a dedicated application may be configured to execute on a client device to perform the activation of the transaction card. In other embodiments, a web portal, a web-based app, an applet, and/or the like may perform the activation. Activation may be performed on the client device, or the client device may merely act as a go between for the transaction card and an external device (e.g., account server). According to some embodiments, in providing activation, the application may indicate, to the account server, the type of device performing the activation (e.g., personal computer, smartphone, tablet, or point-of-sale (POS) device). Further, the application may output, for transmission, different and/or additional data to the account server depending on the type of device involved. For example, such data may comprise information associated with a merchant, such as merchant type, merchant ID, and information associated with the device type itself, such as POS data and POS ID.

In some embodiments, the example authentication communication protocol may mimic an offline dynamic data authentication protocol of the EMV standard that is commonly performed between a transaction card and a point-of-sale device, with some modifications. For example, because the example authentication protocol is not used to complete a payment transaction with a card issuer/payment processor per se, some data values are not needed, and authentication may be performed without involving real-time online connectivity to the card issuer/payment processor. As is known in the art, point of sale (POS) systems submit transactions including a transaction value to a card issuer. Whether the issuer approves or denies the transaction may be based on if the card issuer recognizes the transaction value. Meanwhile, in certain embodiments of the present disclosure, transactions originating from a mobile device lack the transaction value associated with the POS systems. Therefore, in some embodiments, a dummy transaction value (i.e., a value recognizable to the card issuer and sufficient to allow activation to occur) may be passed as part of the example authentication communication protocol. POS based transactions may also decline transactions based on the number of transaction attempts (e.g., transaction counter). A number of attempts beyond a buffer value may result in a soft decline; the soft decline requiring further verification before accepting the transaction. Further verification may be provided by the above described user input to the indicia on the transaction card, which is then received and processed by the user interface in direct physical contact with the transaction card.

In some examples, the transaction card can selectively communicate information depending upon the recipient device. Once the user input is received, the transaction card can recognize the device to which the input is directed, and based on this recognition the transaction card can provide appropriate data for that device. This advantageously allows the transaction card to transmit only the information required to complete the instant action or transaction, such as a payment or card authentication. By limiting the transmission of data and avoiding the transmission of unnecessary data, both efficiency and data security can be improved. The recognition and selective communication of information can be applied to various scenarios, including card activation, balance transfers, account access attempts, commercial transactions, etc., as a way to reduce fraud.

If the transaction card input is directed to a device running Apple's iOS® operating system, e.g., an iPhone, iPod, or iPad, the transaction card can recognize the iOS® operating system and transmit data appropriate data to communicate with this device. For example, the transaction card can provide the encrypted identity information necessary to authenticate the card using NDEF tags via, e.g., NFC. Similarly, if the transaction card input is directed to a device running the Android® operating system, e.g., an Android® smartphone or tablet, the transaction card can recognize the Android® operating system and transmit appropriate and data to communicate with this device (such as the encrypted identity information necessary for authentication by the methods described herein).

As another example, the transaction card input can be directed to a POS device, including without limitation a kiosk, a checkout register, a payment station, or other terminal. Upon performance of the user input to the overlay, the transaction card can recognize the POS device and transmit only the information necessary for the action or transaction. For example, upon recognition of a POS device used to complete a commercial transaction, the transaction card can communicate payment information necessary to complete the transaction under the EMV standard.

In some examples, the POS devices participating in the transaction can require or specify additional information, e.g., device-specific information, location-specific information, and transaction-specific information, that is to be provided by the transaction card. For example, once the POS device receives a data communication from the transaction card, the POS device can recognize the transaction card and request the additional information necessary to complete an action or transaction, such as a sequence input to the overlay via the indicia.

In some examples, data may be collected on user input behaviors as biometric/gestural authentication. For example, a unique identifier that is cryptographically secure and not susceptible to interception may be transmitted to one or more backend services. The unique identifier may be configured to look up secondary information about individual. The secondary information may comprise personally identifiable information about the user. In some examples, the secondary information may be stored within the transaction card.

Although the illustrative methods 500 and 800 are described as a series of acts or events, the present disclosure is not limited by the illustrated ordering of such acts or events unless specifically stated. For example, some acts may occur in different orders and/or concurrently with other acts or events apart from those illustrated and/or described herein, in accordance with the disclosure. In addition, not all illustrated acts or events may be necessary to implement a methodology in accordance with the present disclosure.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
   a client device comprising a card reader and a touch screen interface graphically displaying two or more location indicators, wherein a display location of each location indicator of the two or more location indicators is variable between subsequent transactions;
   a transaction card comprising a plurality of apertures through a body, wherein each of the plurality of apertures permits a user input by physical contact to the touch screen interface, wherein a first main side of the transaction card includes at least two registration marks visible on the first main side to align with at least two location indicators of the two or more location indicators, wherein the at least two registration marks are proximate to one or more edges of the transaction card and the at least two location indicators are proximate to the at least two registration marks while the transaction card is appropriately positioned on the touch screen; and
   a memory device storing instructions; and
   one or more processors configured to execute the instructions to:
      authenticate a transaction using the transaction card in response to receiving a primary authentication at an application of the client device;
      display a challenge question on the client device descriptive of an ordered sequence of more than one of the plurality of apertures as presented on the transaction card; and
      provide a secondary authentication for the transaction after a comparison between the user input to the touch screen interface and an expected relative position between actuated touch locations of the user input and the one or more location indicators, wherein the user input is the ordered sequence of the more than one of the plurality of apertures described in the challenge question.

2. The system of claim 1, wherein the two or more location indicators include sets of color coded location indicators, encoded with different colors, wherein alignment of the transaction card with an incorrect set of location indicators will cause the transaction to fail.

3. The system of claim 2, wherein a second main side of the body is in direct physical contact with the touch screen interface.

4. The system of claim 1, wherein the body of the transaction card comprises at least one of: an identification chip, and a magnetic stripe.

5. The system of claim 1, wherein the two or more location indicators comprise a first location indicator and a second location indicator simultaneously displayed on the touch screen interface, wherein the transaction is a payment transaction authenticated when the transaction card is aligned with the first location indicator, and wherein the payment transaction is denied when the transaction card is aligned with the second location indicator.

6. The system of claim 1, the one or more processors further configured to execute the instructions to:
   retrieve an account passcode associated with the transaction card; and
   compare an actuation sequence of the actuated touch locations of the user input to the account passcode.

7. The system of claim 1, further comprising a mobile device, wherein the touch screen interface is part of the mobile device.

8. The system of claim 1, wherein the body of the transaction card is positionable with respect to the touch screen interface.

9. The system of claim 1, wherein a second main side of the body is in direct physical contact with the touch screen interface.

10. A method, comprising:
   receiving a primary authentication at an application of a client device to authenticate a transaction card during a payment transaction, wherein the primary authentication is received at a card reader from an identification chip or a magnetic stripe of the transaction card;
   graphically displaying, via a touch screen interface, two or more location indicators comprising a first location indicator and a second location indicator, wherein the first and second location indicators are simultaneously displayed at different locations on the touch screen interface, wherein a first main side of the transaction card includes at least two registration marks visible on the first main side to align with at least two location indicators of the two or more location indicators, wherein the at least two registration marks are proximate to one or more edges of the transaction card and the at least two location indicators are proximate to the at least two registration marks while the transaction card is appropriately positioned on the touch screen;

graphically displaying a challenge question on the client device descriptive of an ordered sequence of more than one of a plurality of apertures as presented on the transaction card;

receiving, through the plurality of apertures of the transaction card, a user input by physical contact with the touch screen interface to actuate corresponding touch locations on the touch screen interface; and comparing the user input to the ordered sequence of the more than one of the plurality of apertures to provide a secondary authentication for the payment transaction, wherein the ordered sequence of the more than one of the plurality of apertures is an expected relative position between the touch locations and the first location indicator or the second location indicator.

11. The method of claim 10, further comprising aligning at least two registration marks visible on the first main side of a body of the transaction card with the first or second location indicators, wherein the transaction is authenticated when one of the registration marks is aligned with the first location indicator, and wherein the transaction is denied when one of the registration marks is aligned with the second location indicator, wherein the first location indicator is color coded with a different color than a color coding of the second location indicator.

12. The method of claim 10, further comprising determining whether to provide the secondary authentication of the payment transaction based on a comparison between the user input and an actuation sequence of the touch locations actuated by the user input.

13. The method of claim 10, further comprising varying a display location of the first and second location indicators between subsequent payment transactions.

14. A system, comprising:
a client device comprising a card reader and a touch screen interface graphically displaying two or more location indicators including a first location indicator and a second location indicator, wherein a display location of the first and second location indicators is variable between subsequent payment transactions;
a transaction card comprising a body and a plurality of apertures through the body, wherein each of the plurality of apertures permits a user input by physical contact to the touch screen interface, wherein a first main side of the transaction card includes at least two registration marks visible on the first main side to align with at least two location indicators of the two or more location indicators, wherein the at least two registration marks are proximate to one or more edges of the transaction card and the at least two location indicators are proximate to the at least two registration marks while the transaction card is appropriately positioned on the touch screen; and
a memory device storing instructions; and
one or more processors configured to execute the instructions to:
authenticate a payment transaction using the transaction card in response to receiving a primary authentication at an application of the client device, wherein the primary authentication is received at the card reader from an identification chip or a magnetic stripe of the transaction card;
display a challenge question on the client device descriptive of an ordered sequence of more than one of the plurality of apertures as presented on the transaction card; and
provide a secondary authentication for the payment transaction after a comparison between the user input to the touch screen interface and the ordered sequence of the more than one of the plurality of apertures, wherein the ordered sequence of the more than one of the plurality of apertures is an expected relative position between actuated touch locations of the user input and the first location indicator or the second location indicator.

15. The system of claim 14, wherein the two or more location indicators include sets of color coded location indicators, encoded with different colors, wherein alignment of the transaction card with an incorrect set of location indicators will cause the transaction to fail.

16. The system of claim 14, wherein a second main side of the body is in direct physical contact with the touch screen interface.

17. The system of claim 14, wherein the body of the transaction card comprises at least one of: the identification chip, and the magnetic stripe.

18. The system of claim 14, wherein the payment transaction is authenticated when the transaction card is aligned with the first location indicator and wherein the payment transaction is denied when the transaction card is aligned with the second location indicator.

19. The system of claim 14, the one or more processors further configured to execute the instructions to:
retrieve an account passcode associated with the transaction card; and
compare an actuation sequence of the actuated touch locations of the user input to the account passcode.

20. The system of claim 14, further comprising a mobile device, wherein the touch screen interface is part of the mobile device.

* * * * *